United States Patent
Oga

(10) Patent No.: US 12,543,149 B2
(45) Date of Patent: Feb. 3, 2026

(54) COMMUNICATION SYSTEM CAPABLE OF IMPROVING OPERABILITY FOR SPECIFIC USER, COMMUNICATION APPARATUS, COMMUNICATION CONTROL METHOD, METHOD OF CONTROLLING COMMUNICATION APPARATUS, AND STORAGE MEDIUM

(71) Applicant: CANON KABUSHIKI KAISHA, Tokyo (JP)

(72) Inventor: Satohiro Oga, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 389 days.

(21) Appl. No.: 18/311,916

(22) Filed: May 4, 2023

(65) Prior Publication Data

US 2023/0370999 A1    Nov. 16, 2023

(30) Foreign Application Priority Data

May 12, 2022    (JP) .................................. 2022-079059

(51) Int. Cl.
*H04W 4/00*    (2018.01)
*H04W 68/00*    (2009.01)
*H04W 72/30*    (2023.01)

(52) U.S. Cl.
CPC ......... *H04W 68/005* (2013.01); *H04W 72/30* (2023.01)

(58) Field of Classification Search
CPC . H04W 68/005; H04W 72/30; H04M 1/7243; H04M 1/72433; H04M 1/72436
See application file for complete search history.

(56) References Cited

U.S. PATENT DOCUMENTS

| | | | | |
|---|---|---|---|---|
| 5,007,095 A | * | 4/1991 | Nara | G10L 13/08 704/261 |
| 6,456,841 B1 | * | 9/2002 | Tomimori | H04M 1/72451 455/412.2 |
| 6,512,449 B1 | * | 1/2003 | Aizawa | H04M 1/7243 345/184 |
| 6,891,933 B2 | * | 5/2005 | Kumamoto | H04L 51/224 709/217 |
| 7,440,746 B1 | * | 10/2008 | Swan | H04M 3/42365 707/999.001 |

(Continued)

FOREIGN PATENT DOCUMENTS

JP    2015225258 A    12/2015

*Primary Examiner* — Stephen M D Agosta
(74) *Attorney, Agent, or Firm* — ROSSI, KIMMS & McDOWELL LLP

(57) ABSTRACT

A communication system capable of improving an operability of an apparatus in a case where a message is desired to be notified to a specific user of an indefinite number of users who use the apparatus. The communication system includes a first communication apparatus, a second communication apparatus, and a server. A first designation unit in the first communication apparatus designates the second communication apparatus as a destination of a message. A second designation unit in the first communication apparatus designates an addressee of the message and is capable of designating an addressee based on candidate information of addressees, which is acquired from the server. A control unit controls processing of the message.

6 Claims, 17 Drawing Sheets

(56) References Cited

U.S. PATENT DOCUMENTS

| | | | |
|---|---|---|---|
| 7,502,740 B2* | 3/2009 | Nishii | G06Q 10/107 709/224 |
| 7,899,487 B2* | 3/2011 | Oh | H04M 1/72436 455/566 |
| 9,332,115 B2* | 5/2016 | Imaeda | H04M 1/72412 |
| 9,565,299 B2* | 2/2017 | Shim | H04M 3/42068 |
| 9,961,187 B2* | 5/2018 | Seol | H04M 1/72436 |
| 10,091,157 B2* | 10/2018 | McMichael | H04W 12/02 |
| 10,812,428 B2* | 10/2020 | Ahn | G06F 3/04847 |
| 12,061,721 B1* | 8/2024 | Pala | G06F 21/6263 |
| 2001/0034244 A1* | 10/2001 | Calder | H04M 1/275 455/556.1 |
| 2001/0054072 A1* | 12/2001 | Discolo | G06Q 10/109 709/204 |
| 2002/0071528 A1* | 6/2002 | Kumamoto | H04L 61/45 709/206 |
| 2002/0151326 A1* | 10/2002 | Awada | H04M 1/2747 455/556.1 |
| 2004/0076139 A1* | 4/2004 | Kang-Yeh | H04L 67/04 370/352 |
| 2005/0014490 A1* | 1/2005 | Desai | H04M 3/537 455/414.1 |
| 2005/0032527 A1* | 2/2005 | Sheha | H04M 1/2746 455/457 |
| 2005/0070258 A1* | 3/2005 | Stanco | H04W 4/029 455/414.1 |
| 2005/0169310 A1* | 8/2005 | Knapp | H04L 63/08 709/236 |
| 2006/0063541 A1* | 3/2006 | Ryu | H04W 4/14 455/403 |
| 2006/0128363 A1* | 6/2006 | Cooling | G06F 11/1464 714/E11.125 |
| 2006/0136546 A1* | 6/2006 | Trioano | G06Q 30/02 709/203 |
| 2006/0286971 A1* | 12/2006 | Maly | H04M 1/2757 455/415 |
| 2007/0111711 A1* | 5/2007 | Ratnakar | H04M 1/2757 455/418 |
| 2007/0225976 A1* | 9/2007 | Wang | G10L 13/00 704/235 |
| 2008/0090597 A1* | 4/2008 | Celik | H04W 4/14 455/466 |
| 2008/0305814 A1* | 12/2008 | Deng | H04M 1/72436 455/466 |
| 2009/0300010 A1* | 12/2009 | Ratnakar | G06Q 30/02 707/999.005 |
| 2010/0062749 A1* | 3/2010 | Yasuda | H04M 1/72448 455/414.1 |
| 2010/0077044 A1* | 3/2010 | Tsubouchi | H04M 1/72409 709/217 |
| 2010/0087170 A1* | 4/2010 | Ikeda | H04M 3/53383 455/466 |
| 2011/0185281 A1* | 7/2011 | Pearson | G06Q 10/107 715/739 |
| 2012/0242582 A1* | 9/2012 | Choi | G06F 3/0233 345/169 |
| 2013/0072262 A1* | 3/2013 | Mhun | H04M 1/72469 455/566 |
| 2013/0080540 A1* | 3/2013 | Cai | H04W 4/14 709/206 |
| 2013/0130657 A1* | 5/2013 | Park | H04W 4/12 455/412.1 |
| 2013/0238722 A1* | 9/2013 | Carmody | H04L 51/234 709/206 |
| 2014/0156770 A1* | 6/2014 | Zheng | G06F 16/9535 709/206 |
| 2014/0188463 A1* | 7/2014 | Noh | G10L 15/00 704/201 |
| 2014/0257983 A1* | 9/2014 | Trioano | G06Q 30/0267 705/14.55 |
| 2015/0201062 A1* | 7/2015 | Shih | H04M 1/56 455/564 |
| 2015/0350147 A1* | 12/2015 | Shepherd | H04L 51/02 715/752 |
| 2016/0105781 A1* | 4/2016 | Wells | H04M 7/0024 455/466 |
| 2016/0139998 A1* | 5/2016 | Dunn | G06F 3/0482 707/640 |
| 2018/0139565 A1* | 5/2018 | Norris | H04S 7/304 |
| 2019/0069334 A1* | 2/2019 | Windorfer | H04L 12/2803 |
| 2020/0184520 A1* | 6/2020 | Fletcher | H04L 65/60 |
| 2021/0352218 A1* | 11/2021 | Watanabe | H04N 5/91 |
| 2023/0300237 A1* | 9/2023 | Assis Dourado | H04M 1/72418 455/567 |

\* cited by examiner

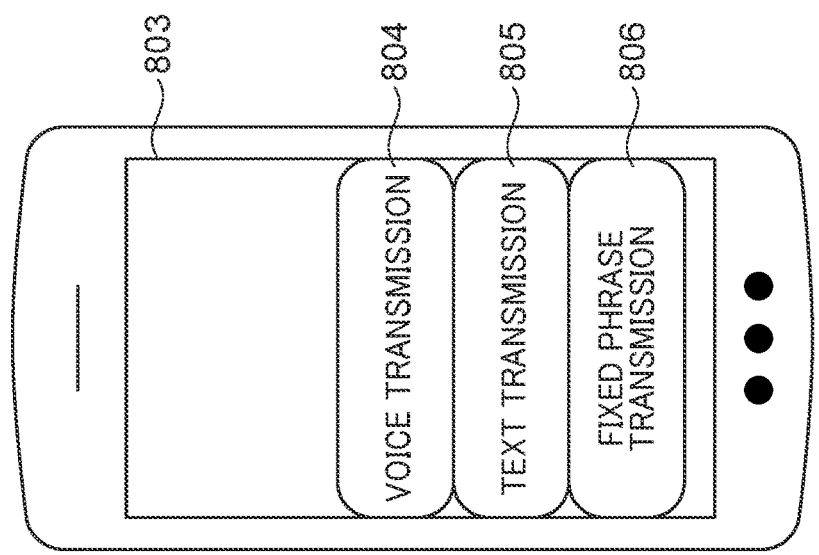
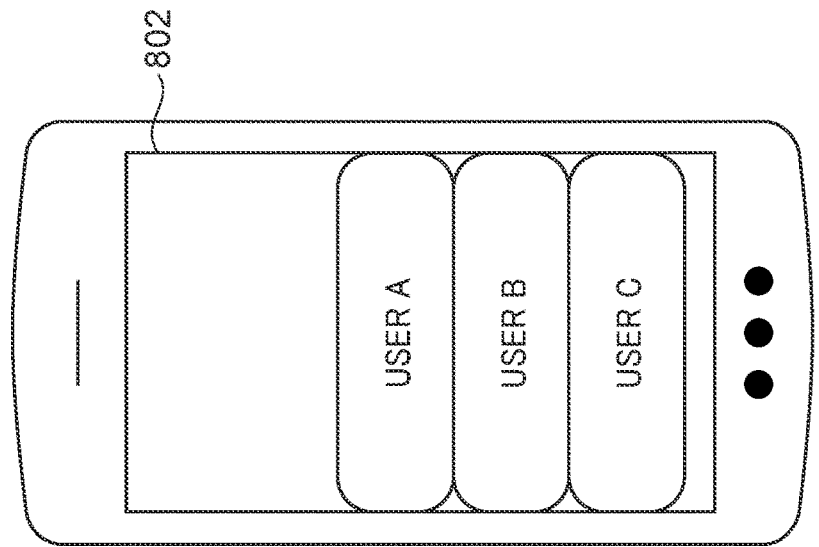
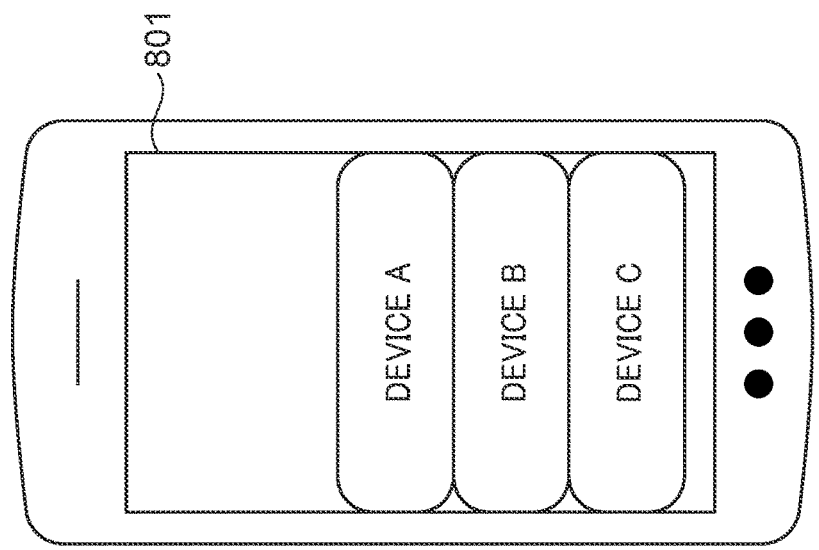

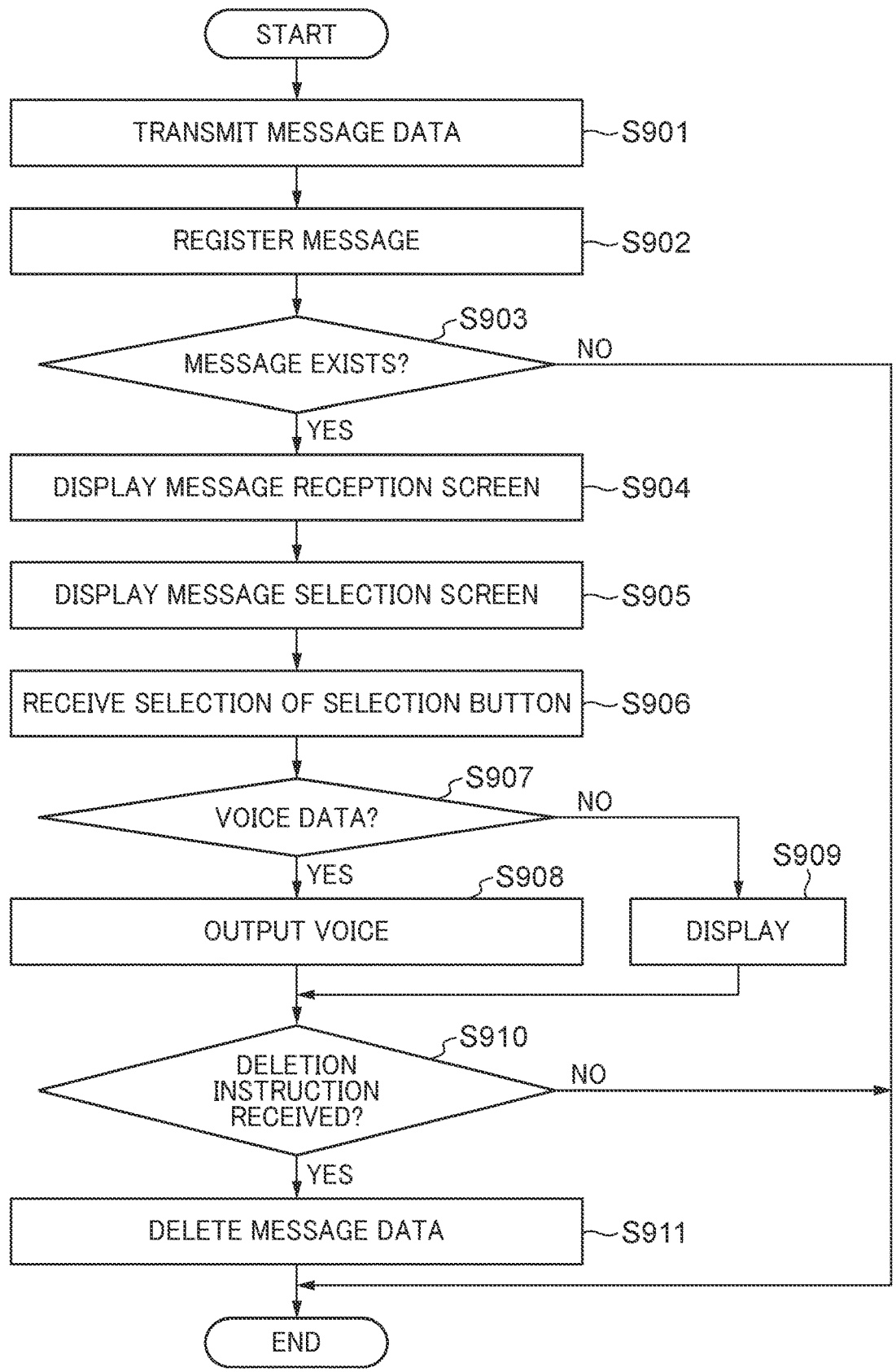

COMMUNICATION SYSTEM CAPABLE OF IMPROVING OPERABILITY FOR SPECIFIC USER, COMMUNICATION APPARATUS, COMMUNICATION CONTROL METHOD, METHOD OF CONTROLLING COMMUNICATION APPARATUS, AND STORAGE MEDIUM

BACKGROUND OF THE INVENTION

Field of the Invention

The present invention relates to a communication system, a communication apparatus, a communication control method, a method of controlling the communication apparatus, and a storage medium.

Description of the Related Art

There has been known a technique of storing a message in an apparatus, e.g. a household electrical appliance, and notifying the message to a user using the apparatus (e.g. see Japanese Laid-Open Patent Publication (Kokai) No. 2015-225258.

However, the technique disclosed in Japanese Laid-Open Patent Publication (Kokai) No. 2015-225258 has room for improvement of an operability in a case where a message is desired to be notified to a specific user of an indefinite number of users who use the apparatus.

SUMMARY OF THE INVENTION

The invention provides a communication system which is capable of improving an operability of an apparatus in a case where a message is desired to be notified to a specific user of an indefinite number of users who use the apparatus, a communication apparatus, a communication control method, a method of controlling the communication apparatus, and a storage medium.

In a first aspect of the present invention, there is provided a communication system including a first communication apparatus, a second communication apparatus, and a server, including a first designation unit configured to designate, in the first communication apparatus, the second communication apparatus as a destination of a message, a second designation unit configured to designate, in the first communication apparatus, an addressee of the message, and be capable of designating the addressee based on candidate information of addressees, which is acquired from the server, and a control unit configured to control processing of the message.

In a second aspect of the present invention, there is provided a communication apparatus that transmits data for causing a reception apparatus to output a message, to the reception apparatus via a server, including a first designation unit configured to designate a destination of the message, a unit configured to acquire candidate information of addressees from the server, a second designation unit configured to designate an addressee of the message and be capable of designating the addressee based on the candidate information, and a control unit configured to control processing of the message.

According to the present invention, it is possible to improve an operability of an apparatus in a case where a message is desired to be notified to a specific user of an indefinite number of users who use the apparatus.

Further features of the present invention will become apparent from the following description of exemplary embodiments (with reference to the attached drawings).

BRIEF DESCRIPTION OF THE DRAWINGS

FIGS. 8A to 8C are diagrams each showing an example of a screen displayed on a touch panel appearing in FIG. 4.

FIG. 9 is a flowchart of a message reception control process performed by the reception device appearing in FIG. 1.

DESCRIPTION OF THE EMBODIMENTS

The present invention will now be described in detail below with reference to the accompanying drawings showing embodiments thereof. Note that the following embodiments are not intended to limit the scope of the claims appended hereto, and a combination of all features described in the embodiments is not necessarily essential to the solution of the present invention.

Figure 1:
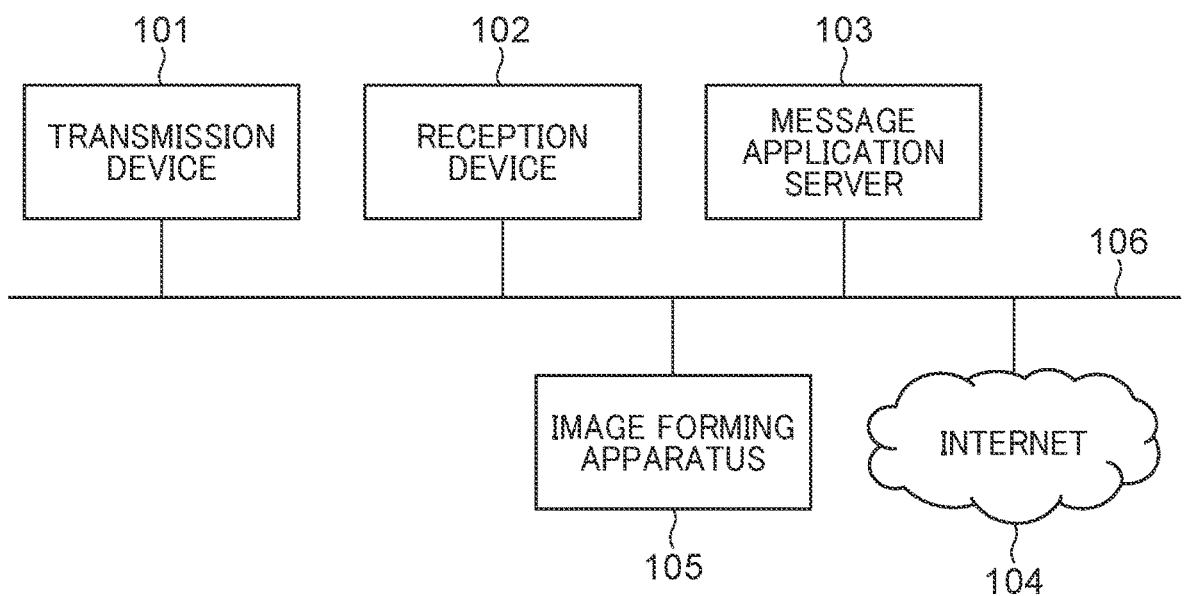
FIG. 1 is a diagram showing an example of a network configuration of a communication system according to an embodiment of the present invention.

FIG. 1 is a diagram showing an example of a network configuration of a communication system 100 according to an embodiment of the present invention. Referring to FIG. 1, the communication system 100 includes a transmission device 101, a reception device 102, a message application server 103, and an image forming apparatus 105. The transmission device 101, the reception device 102, the message application server 103, and the image forming apparatus 105 are connected to a network 106 and are communicable to one another. Further, the network 106 is connected to the Internet 104.

The transmission device 101 as a communication apparatus generates a message. The transmission device 101 transmits message data for causing the message to be output from a destination device to the destination device, e.g. the reception device 102 or the image forming apparatus 105, via the message application server 103. The message data is e.g. voice data for outputting the message as voice or text data for displaying the message.

The reception device 102 is an apparatus, e.g. a household electrical appliance, which is used by an indefinite number of users. The reception device 102 receives message data transmitted by the transmission device 101, from the message application server 103, and outputs the message based on the received message data. For example, in a case where the received message data is text data, the reception device 102 causes the message to be displayed on a user interface (UI) display section 212, described hereinafter with reference to FIG. 2, based on the message data. Alternatively, in a case where the received message data is voice data, the reception device 102 causes the message to be output as voice from a voice output section 213 of the reception device 102, described hereinafter with reference to FIG. 2, based on the message data.

The image forming apparatus 105 is used by a plurality of users registered in advance, and includes a login function that performs user authentication when the image forming apparatus 105 is used by a user. Similar to the reception device 102, the image forming apparatus 105 also receives message data transmitted by the transmission device 101, from the message application server 103, and outputs the message based on the received message data.

Figure 2C:
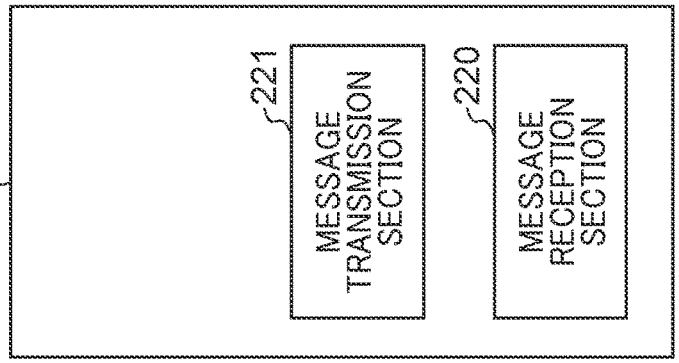
FIGS. 2A to 2C are schematic block diagrams showing respective functional configurations of a transmission device, a reception device, and a message application server, appearing in FIG. 1.
Figure 2B:
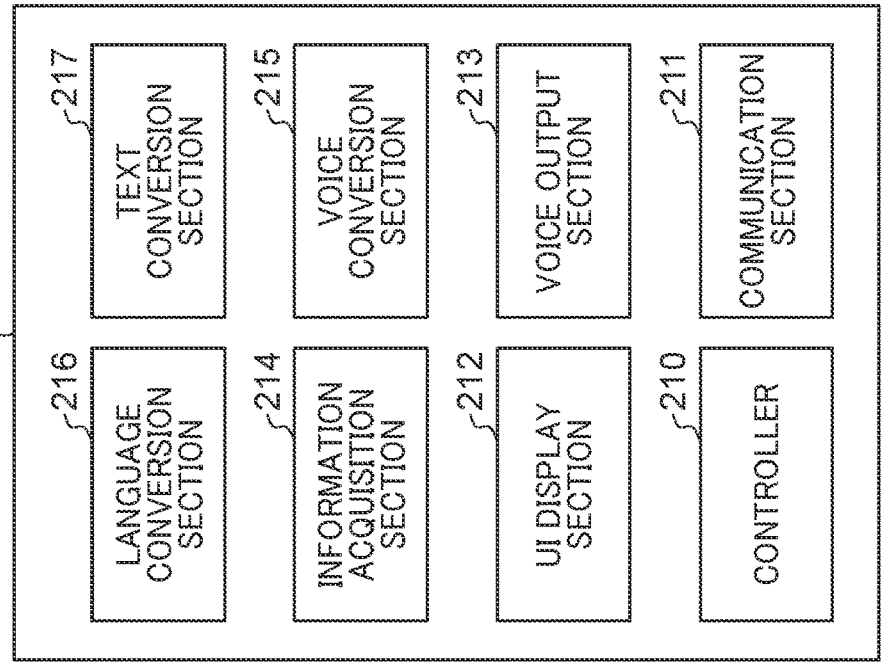
Figure 2A:
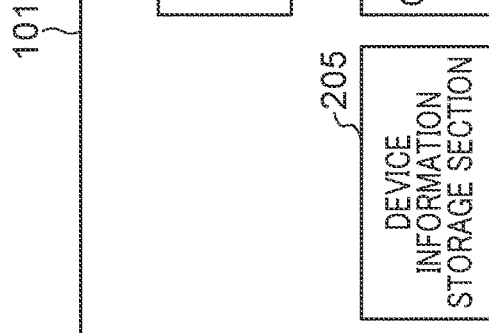

FIGS. 2A to 2C are schematic block diagrams showing respective functional configurations of the transmission device 101, the reception device 102, and the message application server 103, appearing in FIG. 1.

FIG. 2A shows the functional configuration of the transmission device 101. Referring to FIG. 2A, the transmission device 101 includes a user interface controller 201, a message generation section 202, a communication section 203, an information acquisition section 204, and a device information storage section 205.

The user interface controller 201 causes a variety of information to be displayed on a touch panel 405, described hereinafter with reference to FIG. 4, included in the transmission device 101. Further, the user interface controller 201 receives an instruction input to the touch panel 405 by a user. The message generation section 202 generates message data of a message formed by a user. The communication section 203 is comprised of an NFC communication section 407, a Bluetooth communication section 408, and a wireless LAN communication section 409, which are described hereinafter with reference to FIG. 4. The communication section 203 communicates with the message application server 103 in order to transmit the message data generated by the message generation section 202 to a destination designated by the user. Note that in the present embodiment, candidates of a destination of a message are registered in the transmission device 101 in advance. The information acquisition section 204 receives device information, referred to hereinafter, of a device as a destination designated by the user, from the message application server 103. The device information storage section 205 is comprised of a ROM 402 and a flash memory 404, described hereinafter with reference to FIG. 4. The device information storage section 205 stores the device information received from the message application server 103.

FIG. 2B shows the functional configuration of the reception device 102. Referring to FIG. 2B, the reception device 102 includes a controller 210, a communication section 211, the user interface display section 212, the voice output section 213, an information acquisition section 214, a voice conversion section 215, a language conversion section 216, and a text conversion section 217. The controller 210 is comprised of a CPU, a ROM, and a RAM, none of which are shown, and controls the overall operation of the reception device 102. The communication section 211 communicates with the message application server 103 in order to receive message data transmitted by the transmission device 101. The user interface display section 212 displays a message based on message data received by the communication section 211. The voice output section 213 outputs a message as voice based on message data received by the communication section 211. The information acquisition section 214 acquires a variety of information used for display control of the user interface display section 212 and voice output control of the voice output section 213, from the message application server 103. The voice conversion section 215 converts the received message data (text data) to voice data, based on information received from the message application server 103. The language conversion section 216 generates message data to be output as voice in a language indicated by information received from the message application server 103. The text conversion section 217 convers the received message data (voice data) to text data, based on information received from the message application server 103.

FIG. 2C shows the functional configuration of the message application server 103. The message application server 103 includes a message reception section 220 that receives message data from the transmission device 101, and a message transmission section 221 that transmits the message data to a destination designated by a user.

Figure 3:
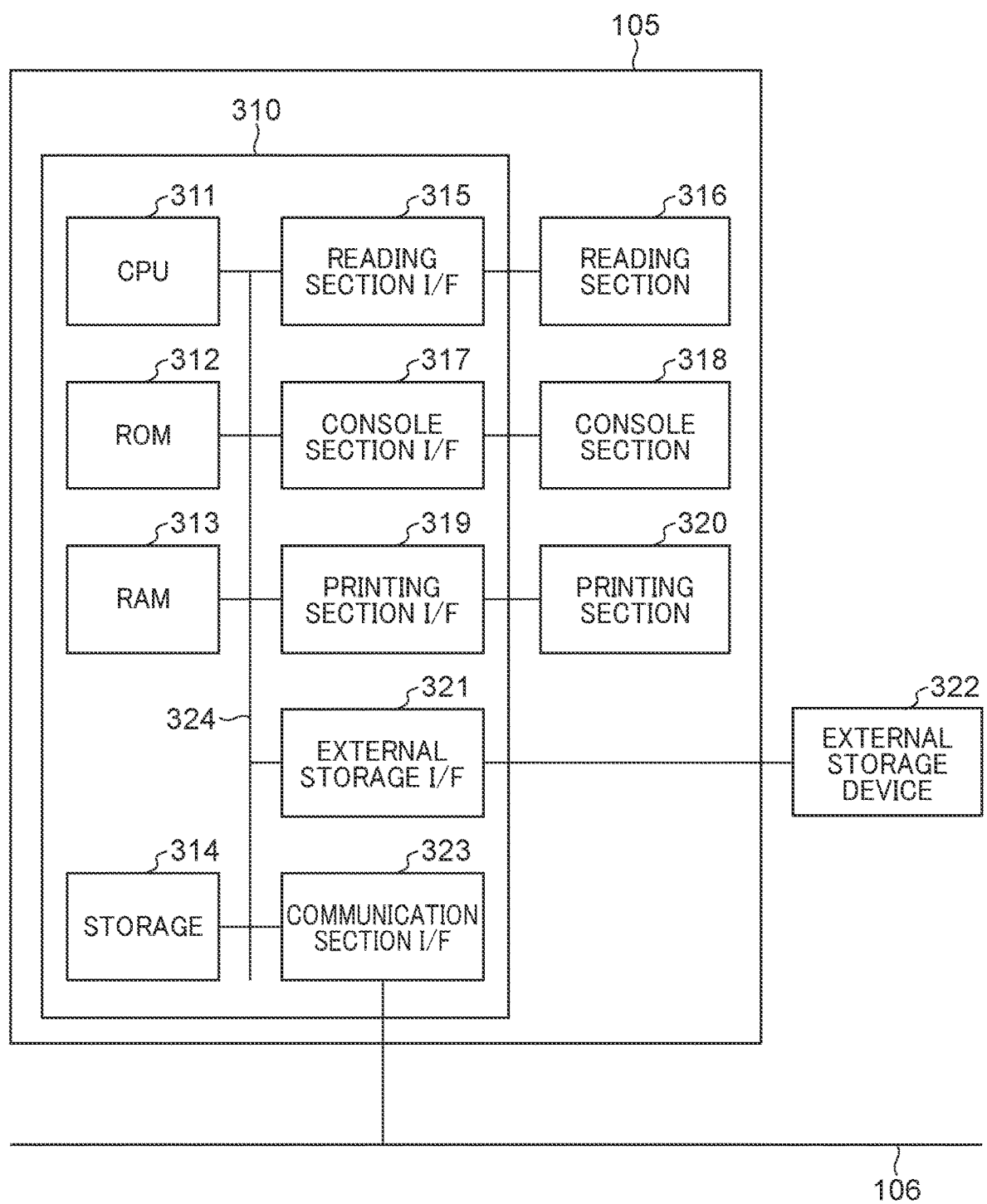
FIG. 3 is a schematic block diagram showing a hardware configuration of an image forming apparatus appearing in FIG. 1.

FIG. 3 is a schematic block diagram showing a hardware configuration of the image forming apparatus 105 appearing in FIG. 1. Referring to FIG. 3, the image forming apparatus 105 includes a controller 310, a reading section 316, a console section 318, and a printing section 320. The controller 310 is connected to the reading section 316, the console section 318, and the printing section 320.

The controller 310 controls the overall operation of the image forming apparatus 105. The controller 310 includes a CPU 311, a ROM 312, a RAM 313, a storage 314, a reading section interface (I/F) 315, a console section interface 317, a printing section interface 319, an external storage interface 321, and a communication section interface 323. The CPU 311, the ROM 312, the RAM 313, the storage 314, the reading section interface 315, the console section interface 317, the printing section interface 319, the external storage interface 321, and the communication section interface 323 are connected to each other via a bus 324.

The CPU 311 reads out control programs stored in the ROM 312 or the storage 314 to perform a variety of control, including reading control and printing control. The ROM 312 stores controls programs and the like executed by the CPU 311. Further, the ROM 312 stores a boot program, font data, and so forth. The RAM 313 is a main memory for the CPU 311. The RAM 313 is used as a temporary storage area for a work area and an area for loading a variety of control programs stored in the ROM 312 and the storage 314. The storage 314 stores image data, print data, an addressee book, a variety of programs, and a variety of setting information. In the present embodiment, a flash memory is assumed as the storage 314, but an auxiliary storge device, such as an SSD, an HDD, an eMMC, or the like, may be used as the storage 314.

Note that in the image forming apparatus 105, it is assumed that one CPU 311 executes processes described hereinafter using one memory (RAM 313), but other forms of execution of the processes may be employed. For example, a plurality of CPUs, RAMs, ROMs and storages may be caused to cooperate to execute the processes described hereinafter. Further, part of the processes may be executed using a hardware circuit, such as an ASIC or an FPGA.

The reading section interface 315 connects between the reading section 316 and the controller 310. The reading section 316 reads an image of an original, and converts the image to image data, such as binary data. The image data generated by the reading section 316 is transmitted to an external apparatus, stored in an external storage device 322, or printed on a recording sheet.

The console section interface 317 connects between the console section 318 and the controller 310. The console section 318 is comprised of a display section for displaying a variety of information and an operation input section for receiving an operation instruction input by a user. The printing section interface 319 connects between the printing section 320 and the controller 310. The CPU 311 transfers image data to be printed (mage data to be printed) to the printing section 320 via the printing section interface 319. The printing section 320 prints an image on a recording sheet fed from a sheet feed cassette (not shown).

The external storage interface 321 connects between the external storage device 322 and the controller 310. The CPU 311 stores image data in the external storage device 322 via the external storage interface 321. In the present embodiment, as the external storage interface 321, a USB interface is assumed, and as the external storage apparatus 322, a USB memory is assumed, but a storage device, such as an SD card, may be used as the external storage device 322.

The controller 310 is connected to the network 106 by the communication section interface 323. The communication section interface 323 performs transmission of image data to an external apparatus and reception of print data from an external apparatus, via the network 106.

Figure 4:
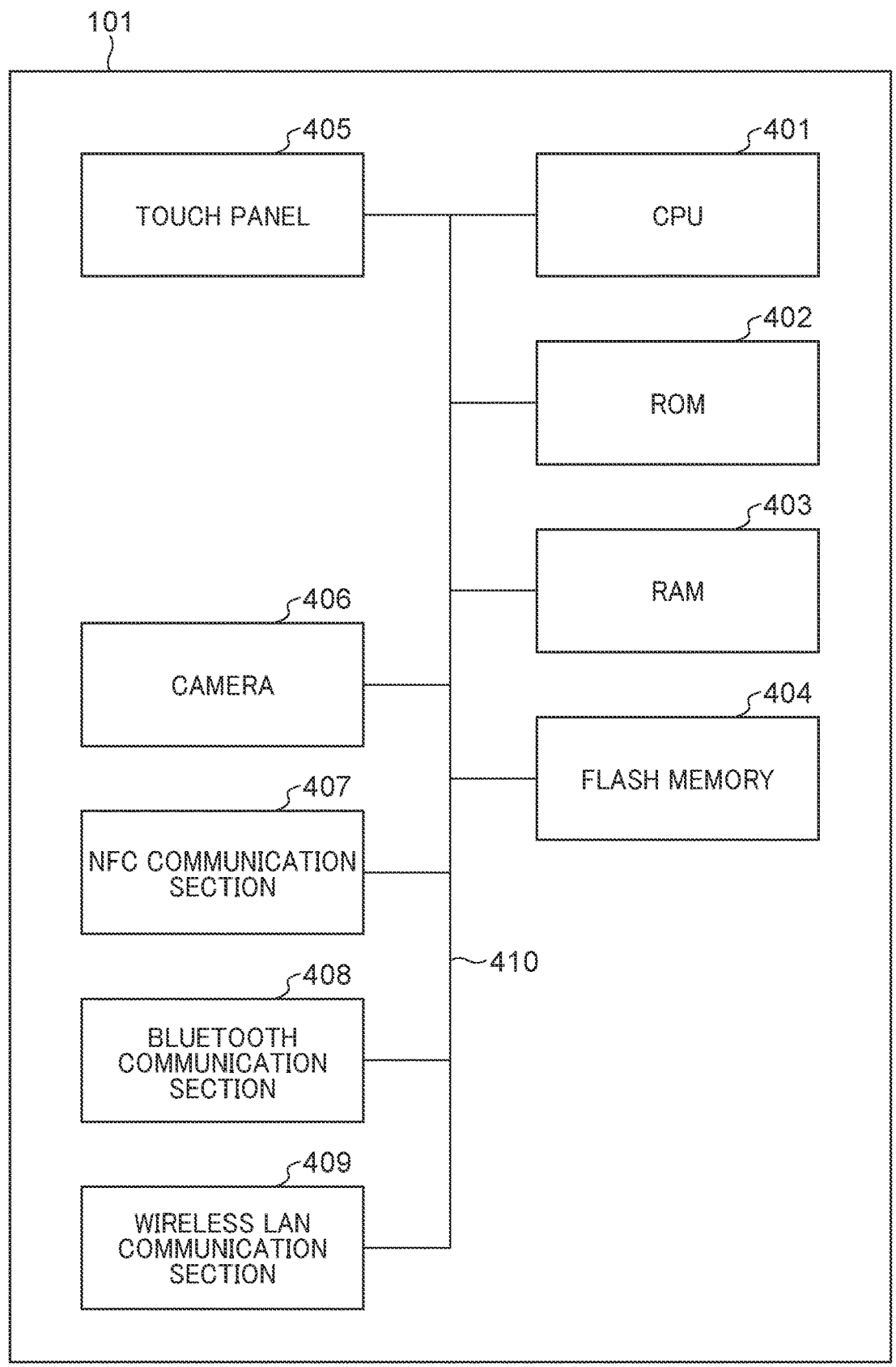
FIG. 4 is a schematic block diagram showing a hardware configuration of the transmission device appearing in FIG. 1.

FIG. 4 is a schematic block diagram showing a hardware configuration of the transmission device 101 appearing in FIG. 1. Note that although in the present embodiment, as the transmission device 101, a smartphone, a tablet PC, or the like is assumed, any other suitable device may be used insofar as the device can be connected to the network 106 using Wi-Fi communication or the like.

Referring to FIG. 4, the transmission device 101 includes a CPU 401, the ROM 402, a RAM 403, the flash memory 404, the touch panel 405, a camera 406, the NFC communication section 407, the Bluetooth communication section 408, and the wireless LAN communication section 409. The CPU 401, the ROM 402, the RAM 403, the flash memory 404, the touch panel 405, the camera 406, the NFC communication section 407, the Bluetooth communication section 408, and the wireless LAN communication section 409 are connected to each other via a bus 410.

The CPU 401 reads out control programs stored in the ROM 402 to perform a variety of processes for controlling the operation of the transmission device 101. The ROM 402 stores the control programs executed by the CPU 401. The RAM 403 is a main memory for the CPU 401. The RAM 403 is sued as a temporary storage area, such as a work area. The flash memory 404 stores a variety of data, such as photographs and electronic documents. The touch panel 405 can detect a touch operation of a user, and displays a variety of screens provided by an operating system (OS) and an electronic mail transmission application. Further, the touch panel 405 is used for checking information stored in the message application server 103. The user performs a touch operation on the touch panel 405 to thereby input a desired operation instruction to the transmission device 101. Note that the transmission device 101 includes hardware keys, not shown, and the user can also input an operation instruction to the transmission device 101 by using the hardware keys.

The camera 406 performs image capturing according to an image capturing instruction of the user. Images of photographs captured by the camera 406 are stored in the flash memory 404. Further, the transmission device 101 is also capable of acquiring information from a QR code (registered trademark) read by the camera 406, using a program capable of analyzing the QR code. The NFC communication section 407 performs near-field wireless communication with an external apparatus based on a communication standard, such as near-field communication (NFC), which has a relatively narrow communication range. The Bluetooth communication section 408 performs wireless communication with an external apparatus base on a communication standard, such as Bluetooth, which has a wider communication range than NFC. Note that the Bluetooth communication section 408 may be compatible with Bluetooth low energy. The wireless LAN communication section 409 performs wireless communication with an external apparatus based on a communication standard, such as Wi-Fi, which has a wider communication range than Bluetooth and is capable of performing high-speed communication.

Figure 5:
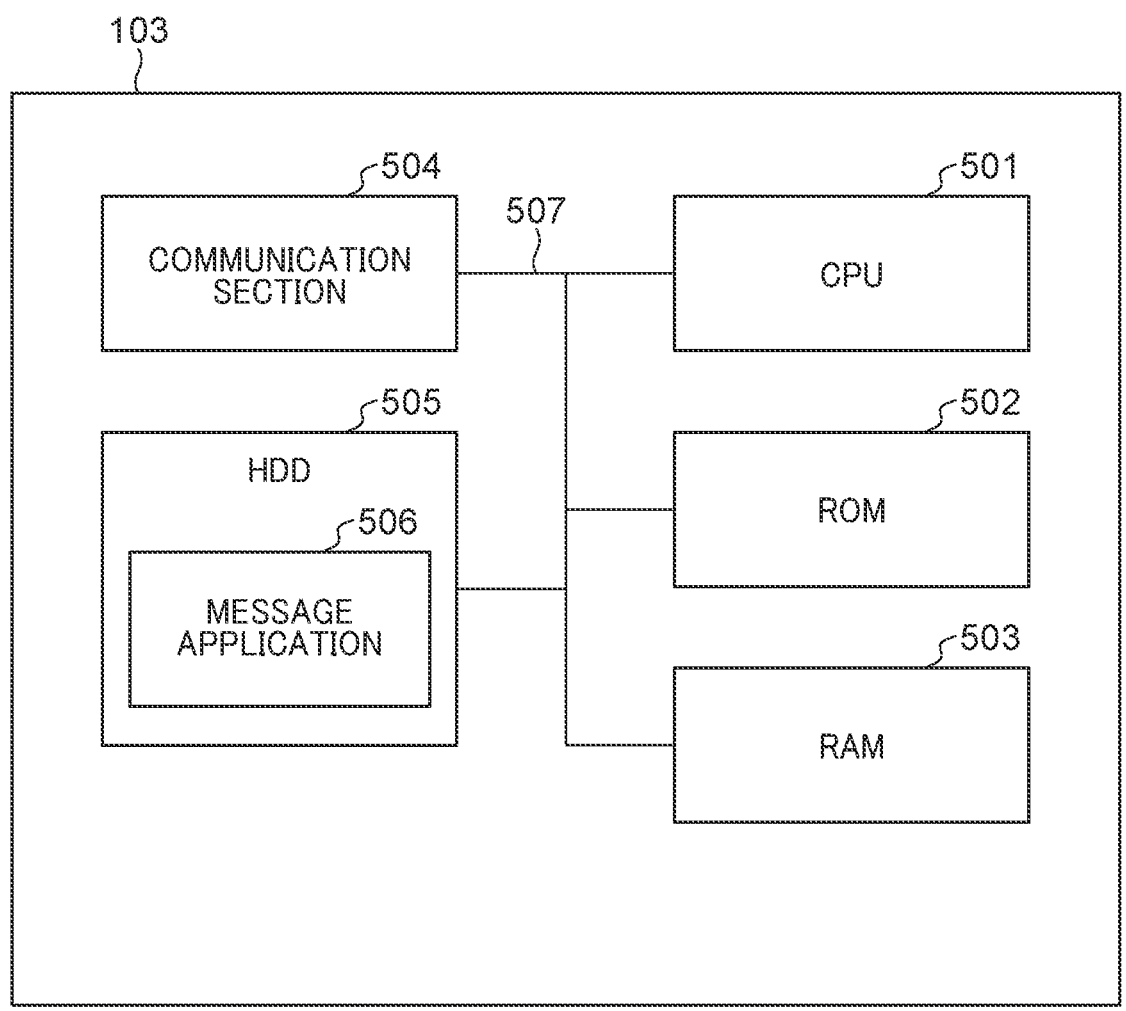
FIG. 5 is a schematic block diagram showing a hardware configuration of the message application server appearing in FIG. 1.

FIG. 5 is a schematic block diagram showing a hardware configuration of the message application server 103 appearing in FIG. 1. Referring to FIG. 5, the message application server 103 includes a CPU 501, a ROM 502, a RAM 503, a communication section 504, and an HDD 505. The CPU 501, the ROM 502, the RAM 503, the communication section 504, and the HDD 505 are connected to each other via a bus 507.

Figure 6A:
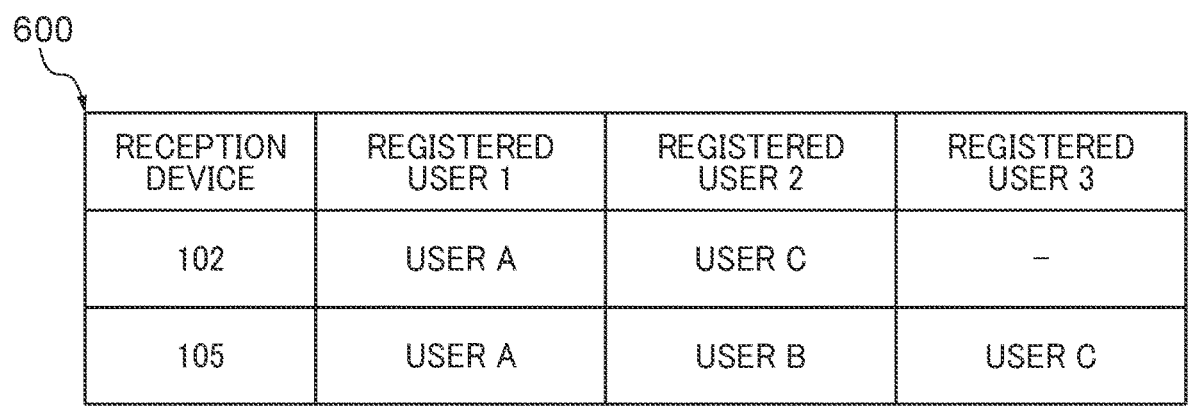
FIGS. 6A and 6B are diagrams each showing an example of information managed by the message application server appearing in FIG. 1.
Figure 6B:
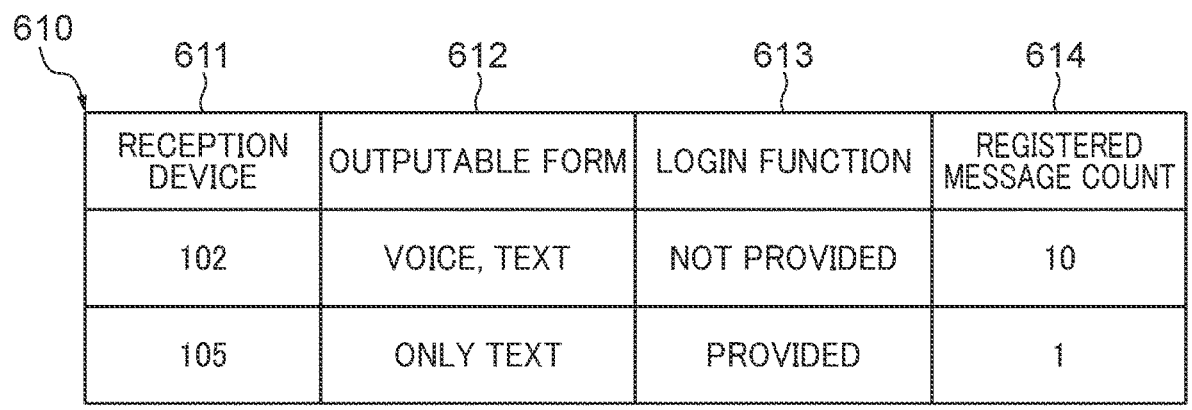

The CPU 501 reads out control programs stored in the ROM 502 and a message application 506 stored in the HDD 505 to perform a variety of processes for controlling the operation of the message application server 103. The ROM 502 stores the control programs and the like. The RAM 503 is a main memory for the CPU 501 and is used as a temporary storage area, such as a work area. The communication section 504 performs transmission and reception of data to and from an external apparatus, such as the transmission device 101 and the reception device 102. Note that the communication section 504 may perform wired communication based on a communication standard of Ethernet (registered trademark) or may perform wireless communication based on a communication standard, such as Wi-Fi. The HDD 505 stores message data received from the transmission device 101 and the like. Further, the HDD 505 stores applications operating on the CPU 501, including the message application 506. Further, the HDD 505 stores an addressee candidate information database 600 shown in FIG. 6A and a device information database 610 shown in FIG. 6B

In the addressee candidate information database 600, information indicating candidates of an addressee of a message is registered for each of devices registered in the transmission device 101, in advance, as candidates of a destination of the message (hereafter referred to as "destination candidate devices"). In the present embodiment, when a user designates a destination of a message for the transmission device 101, the transmission device 101 acquires addressee candidate information corresponding to the destination from the message application server 103. The transmission device 101 prompts the user to select an addressee of the message, based on the acquired addressee candidate information.

In the device information database 610, information on the destination candidate devices is registered. Specifically, in the device information database 610, a reception device 611, an outputable form 612, a login function 613, and a registered message count 514 are registered. The reception device 611 is the name of a destination candidate device. The outputable form 612 is information indicating a type of message data which can be transmitted to a destination candidate device. The login function 613 is information indicating whether a destination candidate device has a login function. The registered message count 614 is the number of message data items which a destination candidate device can store.

Figure 7:
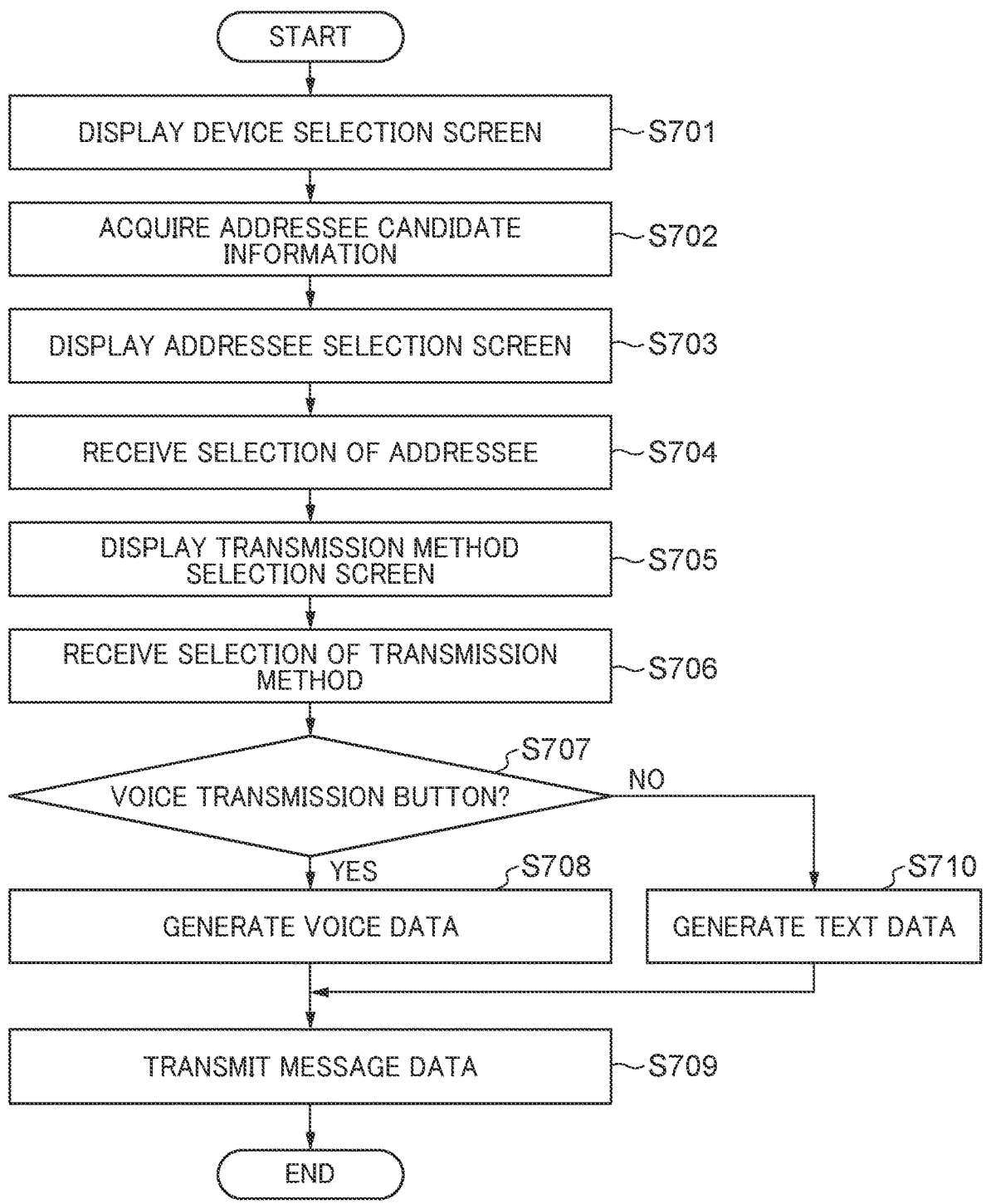
FIG. 7 is a flowchart of a message transmission control process performed by the transmission device appearing in FIG. 1.

FIG. 7 is a flowchart of a message transmission control process performed by the transmission device 101 in FIG. 1. The message transmission control process is realized by the CPU 401 of the transmission device 101, which executes a control program stored in the ROM 402 and loaded into the RAM 403. The message transmission control process in FIG. 7 is started e.g. when a user inputs a destination setting instruction of a message to the touch panel 405 of the transmission device 101.

Referring to FIG. 7, first, the CPU 401 causes a device selection screen 801 in FIG. 8A to be displayed on the touch panels 405 (step S701). The device selection screen 801 is for prompting a user to select a destination of a message. The device selection screen 801 displays a list of destination candidate devices. The device selection screen 801 displays names of devices which are registered in the transmission device 101 in advance, such as the names of the reception device 102 and the image forming apparatus 105. The user can select at least one of a plurality of candidates displayed on the device selection screen 801, as a destination of a message. Here, it is assumed, by way of example, that the user selects the reception device 102 as the destination of the message.

Next, the CPU 401 acquires addressee candidate information of the reception device 102 selected as the destination of the message by the user, from the message application server 103 (step S702). Specifically, the CPU 401 controls the communication section 203 to transmit a notification of a request for the addressee candidate information of the reception device 102 to the message application server 103. The message application server 103 identifies the addressee candidate information indicated by the received notification of the request from the addressee candidate information database 600 and transmits the identified addressee candidate information to the transmission device 101.

Next, the CPU 401 causes an addressee selection screen 802 shown in FIG. 8B to be displayed on the touch panel 405 (step S703). The user can select at least one of a plurality of candidates displayed on the addressee selection screen 802 as the addressee of the message. In other words, in the present embodiment, it is possible to designate a plurality of addresses for the message. This makes it possible to notify the same message to a plurality of designated users of an indefinite number of users who use the reception device 102, only by designating a plurality of addresses on the addressee selection screen 802.

Upon receipt of a user's operation for selecting an addressee or addressees on the addressee selection screen 802 (step S704), the CPU 401 causes a transmission method selection screen 803 shown in FIG. 8C to be displayed on the touch panel 405 (step S705). The transmission method selection screen 803 is for prompting a user to select a transmission method of a message. On the transmission selection screen 803, there are displayed a voice transmission button 804, a text transmission button 805, and a fixed phrase transmission button 806.

The voice transmission button 804 is a button for setting a transmission method of a message to voice transmission. When the transmission method of a message is set to voice transmission, voice data is transmitted as message data. The text transmission button 805 is a button for setting the transmission method of a message to text transmission. When the transmission method of a message is set to text transmission, text data is transmitted as message data. The fixed phrase transmission button 806 is a button for setting the transmission method of a message to fixed phrase transmission. When the transmission method of a message is set to fixed phrase transmission, text data of a fixed phrase registered in advance is transmitted as message data. Note that in a case where the fixed phrase transmission button 806 is selected, the configuration may be such that the user is prompted to select one of a plurality of fixed phrases registered in the transmission device 101 in advance, and the text data of the selected fixed phrase is transmitted.

The user can select one of the plurality of buttons displayed on the transmission method selection screen 803. Upon receipt of a user's operation for selecting a transmission method on the transmission method selection screen 803 (step S706), the CPU 401 determines whether or not the selected button is the voice transmission button 804 (step S707).

If it is determined in the step S707 that the selected button is the voice transmission button 804, the CPU 401 generates voice data based on voice input to the transmission device 101 by the user (step S708). Then, the CPU 401 transmits the generated voice data as message data to a destination selected on the device selection screen 801 (step S709), followed by terminating the present process.

If it is determined in the step S707 that the selected button is not the voice transmission button 804, the CPU 401 generates text data (step S710). For example, in a case where the selected button is the text transmission button 805, text data is generated based on character strings input to the touch panel 405 of the transmission device 101 by the user. Alternatively, in a case where the selected button is the fixed phrase transmission button 806, text data of a fixed phrase registered in the transmission device 102 in advance is selected. Then, the process proceeds to the step S709, wherein the generated or selected text data is transmitted as message data to a destination selected on the device selection screen 801.

Next, processing on a message reception side will be described. Here, a case is described, by way of example, where the reception device 102 receives message data transmitted by the transmission device 101, from the message application server 103.

FIG. 9 is a flowchart of a message reception control process performed by the reception device 102 appearing in FIG. 1. The message reception control process is realized by the CPU of the controller 210 of the reception device 102, which executes a control program stored in the ROM of the controller 210 and loaded into the RAM of the same.

Referring to FIG. 9, the controller 210 controls the communication section 211 to receive message data from the message application server 103 (step S901). Then, the controller 210 registers a message corresponding to the received message data (step S902). Then, the controller 210 determines whether or not the message exists (step S903). In the step S903, for example, in a case where the message data of the registered message remains stored without being deleted, the controller 210 determines that the message exists. On the other hand, in a case where the message data of the registered message has been deleted, the controller 210 determines that the message does not exist.

If it is determined in the step S903 that the message does not exist, the present process is terminated. If it is determined in the step S903 that the message exists, the controller 210 causes the user interface display section 212 to display a message reception screen 1001 shown in FIG. 10A (step S904). The message reception screen 1001 is a screen for notifying transmission devices having transmitted messages registered in the reception device 102. A button 1002 indicates that messages from the transmission device 101 (denoted as "device A" in FIG. 10A) are registered. A button 1003 indicates that messages from a transmission device other than the transmission device 101 are registered. The user can select one of the buttons displayed on the message reception screen 1001.

Figure 10A:
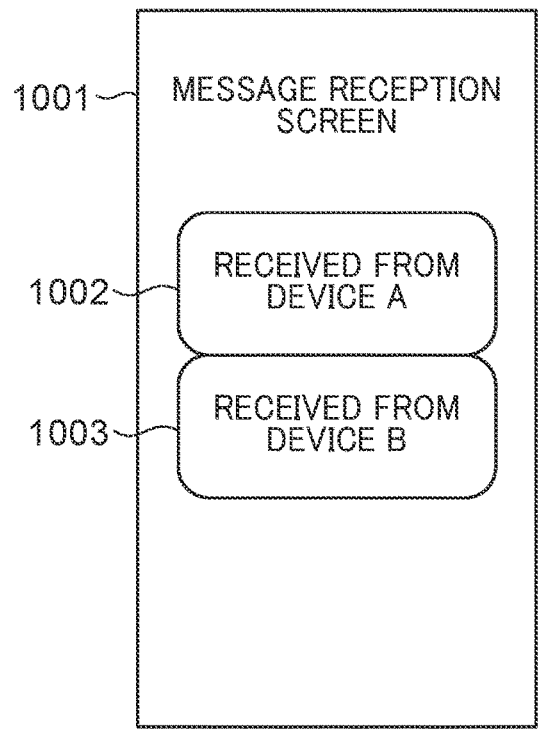
FIGS. 10A to 10D are diagrams each showing an example of a screen displayed on a user interface display section appearing in FIG. 2B.
Figure 10B:
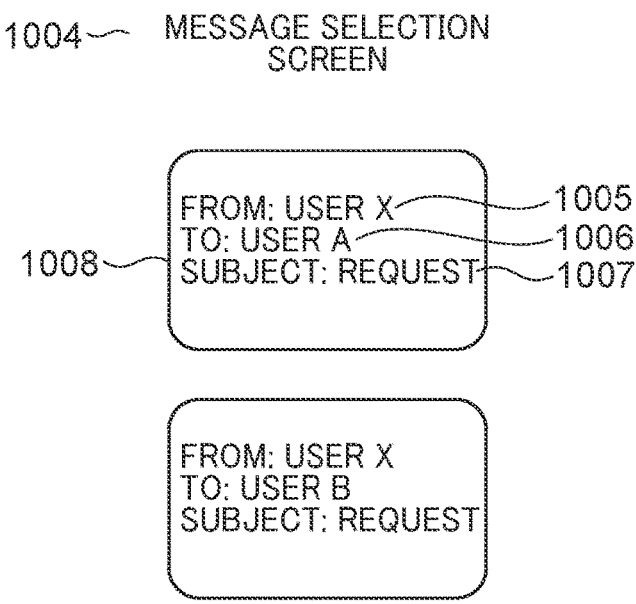

Upon receipt of a user's operation for selecting one of the buttons displayed on the message reception screen 1001, the controller 210 causes the user interface display section 212 to display a message selection screen 1004 shown in FIG. 10B (step S905). Here, it is assumed, by way of example, that the user selects the button 1002 indicating that messages from the transmission device 101 are registered. On the message selection screen 1004, there are displayed selection buttons, including a button 1008, each for selecting one of messages from the transmission device 101. For example, in a case where a plurality of messages from the transmission device 101 are registered, there are displayed a plurality of selection buttons associated with the messages, respectively, on the message selection screen 1004. Each selection button, such as the button 1008 in the illustrated example, displays a user name 1005 of a transmission source of the message, a user name 1006 of an addressee of the same, and a subject 1007 of the same. Note that as the user name 1005 of a transmission source of the message, there may be displayed a user name set in the transmission device 101 in advance, or a user name set when the message is generated. The user can select one of the selection buttons on the message selection screen 1004. Upon detection of selection of a selection button on the message selection screen 1004 (step S906), the process proceeds to a step S907. In the step S907, the controller 210 determines whether or not the message data associated with the selected selection button (hereafter referred to as "the message data of the selected message") is voice data.

If it is determined in the step S907 that the message data of the selected message is voice data, the process proceeds to a step S908. If it is determined in the step S907 that the message data of the selected message is not voice data, the message data of the selected message is text data. In this case, the process proceeds to a step S909.

Figure 10C:
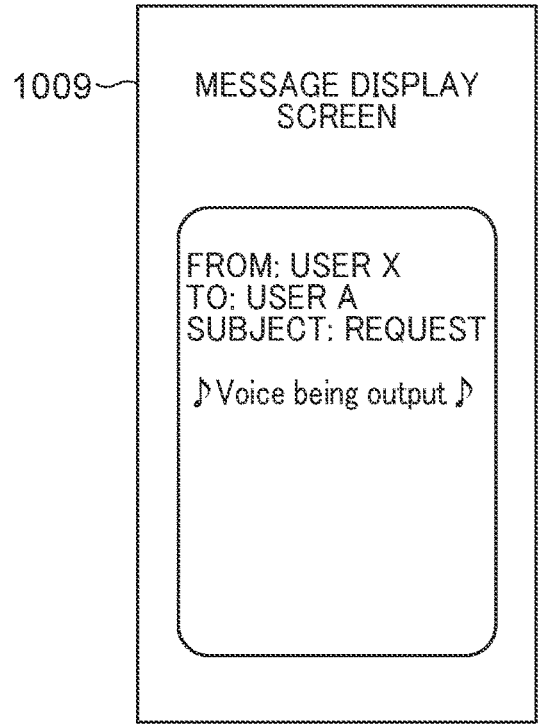

In the step S908, the controller 210 causes the selected message to be output as voice from the voice output section 213. At this time, the user interface display section 212 displays a message display screen 1009 notifying that voice is being output as shown in FIG. 10C. Then, the process proceeds to a step S910.

Figure 10D:
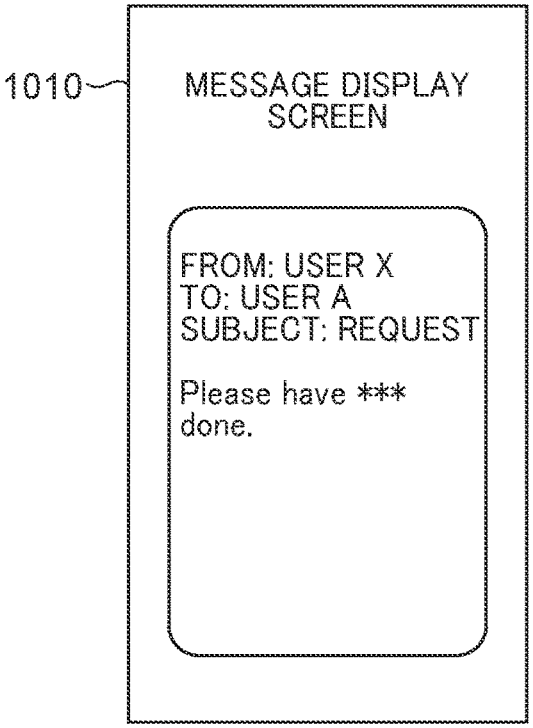

In the step S909, the controller 210 causes the user interface display section 212 to display the selected message. Specifically, the controller 210 causes the user interface display section 212 to display a message display screen 1010 including the selected message, as shown in FIG. 10D. Then, the controller 210 determines whether or not an instruction for deleting the selected message is received from the user (step S910). If it is determined in the step S910 that the instruction for deleting the selected message is not received from the user, the present process is terminated. If it is determined in the step S910 that the instruction for deleting the selected message is received from the user, the controller 210 performs processing for deleting the selected message (step S911). This deletes the message data of the selected message, followed by terminating the present process.

Figure 11:
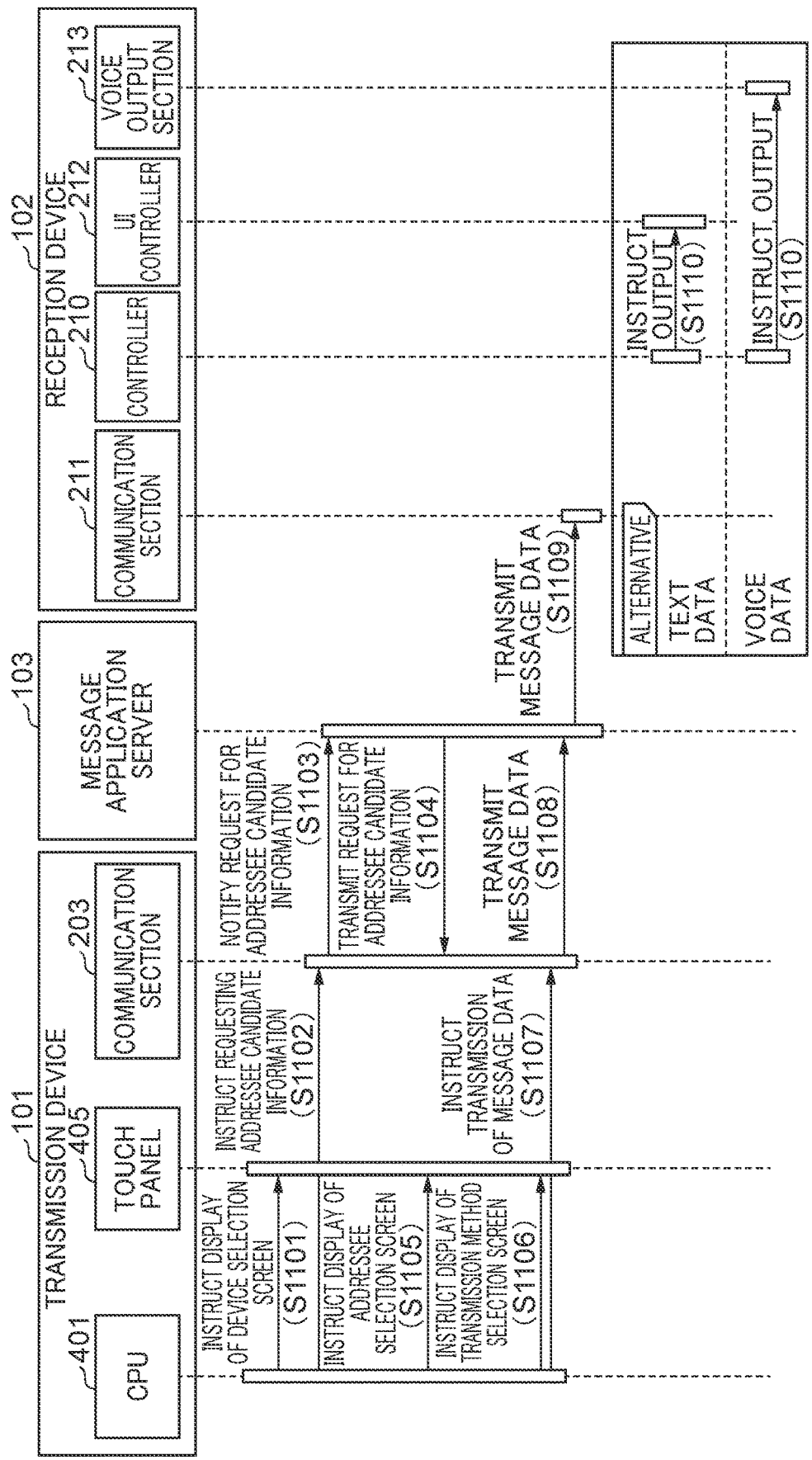
FIG. 11 is a sequence diagram showing a message communication control process performed by the communication system shown in FIG. 1.

FIG. 11 is a sequence diagram showing a message communication control process performed by the communication system 100 shown in FIG. 1. FIG. 11 shows a flow of the process from setting of a destination of a message in the transmission device 101 to outputting of the message by the reception device 102. In the present embodiment, the message communication control process in FIG. 11 is started when the user inputs an instruction for setting a destination of a message to the touch panel 405 of the transmission device 101.

Referring to FIG. 11, first, the CPU 401 of the transmission device 101 gives a display instruction to the touch panel 405 to display the device selection screen 801 (step S1101). According to the display instruction, the device selection screen 801 for prompting the user to select a destination of a message is displayed on the touch panel 405. When the user selects the destination of the message on the device selection screen 801, the CPU 401 gives a request instruction for requesting addressee candidate information of a device selected as the destination by the user to the communication section 203 (step S1102). The communication section 203 having received the request instruction transmits a notification of the request for the addressee candidate information to the message application server 103 (step S1103).

The message application server 103 identifies the addressee candidate information indicated by the received notification of the request from the addressee candidate information database 600. The message application server 103 transmits the identified addressee candidate information to the transmission device (step S1104).

When the communication section 203 receives the addressee candidate information from the message application server 103, the CPU 401 gives, based on the received addressee candidate information, a display instruction for displaying the addressee selection screen 802, to the touch panel 405 (step S1105). According to the display instruction, the addressee selection screen 802 is displayed on the touch panel 405, for prompting the user to select an addressee of the message. When the user selects the addressee of the message on the addressee selection screen 802, the CPU 401 gives a display instruction for displaying the transmission method selection screen 803 to the touch panel 405 (step S1106). According to the display instruction, the transmission method selection screen 803 is displayed on the touch panel 405, for prompting the user to select a transmission method of the message. When the user selects the transmission method of the message on the transmission method selection screen 803, the CPU 401 generates message data based on the selected transmission method. Then, the CPU 401 gives a transmission instruction for transmitting the message data to the communication section 203 (step S1107). The communication section 203 having received the transmission instruction transmits the message data to the message application server 103 (step S1108).

The message application server 103 transmits the message data received from the transmission device 101 to the reception device 102 designated as the destination (step S1109).

When the communication section 211 of the reception device 102 receives the message data from the message application server 103, the controller 210 outputs the message. For example, in a case where the received message data is text data, the controller 210 gives an output instruction for outputting the message, to the user interface display section 212 (step S1110). According to the output instruction, the user interface display section 212 displays the message display screen 1010 including the message.

In a case where the received message data is voice data, the controller 210 gives an output instruction for outputting the message, to the voice output section 213 (step S1110). According to the output instruction, the voice output section 213 outputs the message as voice, followed by terminating the process.

According to the embodiment described above, a destination of a message is designated by the device selection screen 801, and an addressee of the message is designated on the addressee selection screen 802. With this, it is possible to improve the operability of the transmission device 101 when a message is desired to be transmitted to a specific user of an indefinite number of users who use the reception device 102.

Although the invention is described heretofore using the embodiment, the invention is not limited to the embodiment described above. For example, the reception device 102 may receive user information from the message application server 103, and may control, based on the user information, whether to output the message as voice or to display the message.

Figure 12:
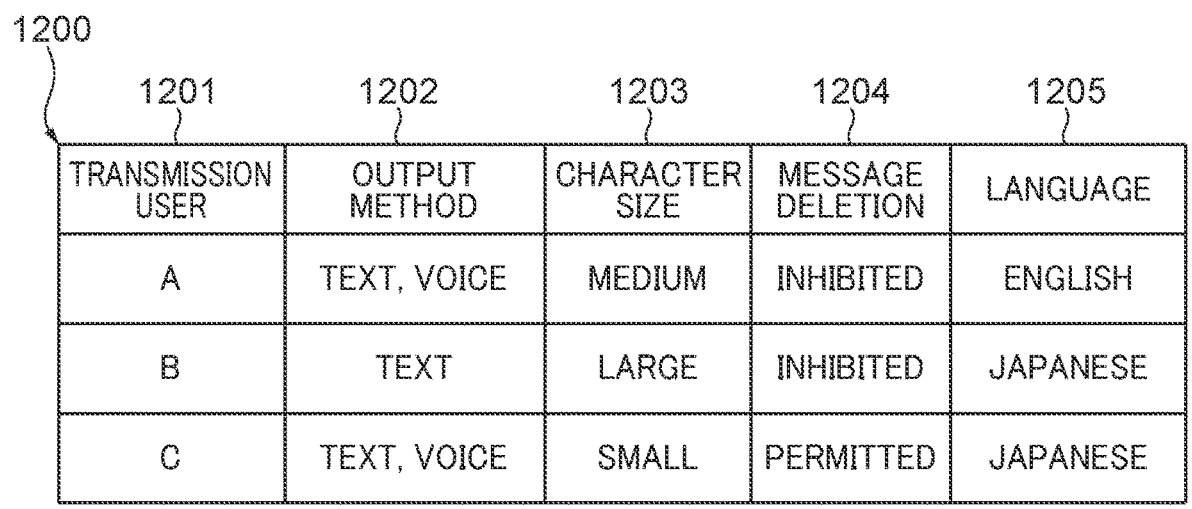
FIG. 12 is a diagram showing an example of a user information database managed by the message application server appearing in FIG. 1.

FIG. 12 is an example of a user information database 1200 managed by the message application server 103 appearing in FIG. 1. In the user information database 1200, there is registered settings information associated with a user as a candidate of an addressee of a message (hereafter referred to as "addressee candidate user"). Specifically, a transmission user 1201, an output method 1202, a character size 1203, message deletion 1204 and a language 1205 are registered in the user information database 1200.

As the transmission user 1201, a name of an addressee candidate user is registered. As the output method 1202, there is registered information indicating a method of outputting a message, which is available when an addressee candidate user registered as the transmission user 1201 is designated as an addressee. The information registered as the output method 1202 includes "voice" indicating that the message can be output as voice and "text" indicating that the message can be displayed. As the character size 1203, there is registered information indicating a character size of a message which is to be displayed on a device having received message data, when an addressee candidate user registered as the transmission user 1201 is designated as an addressee. As the message deletion 1204, there is registered information indicating whether or not to permit a device having received message data to delete message data according to an instruction of a user, when an addressee candidate user registered as the transmission user 1201 is designated as an addressee. As the language 1205, there is registered information indicating a setting of a display language of a device having received message data when an addressee candidate user registered as the transmission user 1201 is designated as an addressee.

Figure 13:
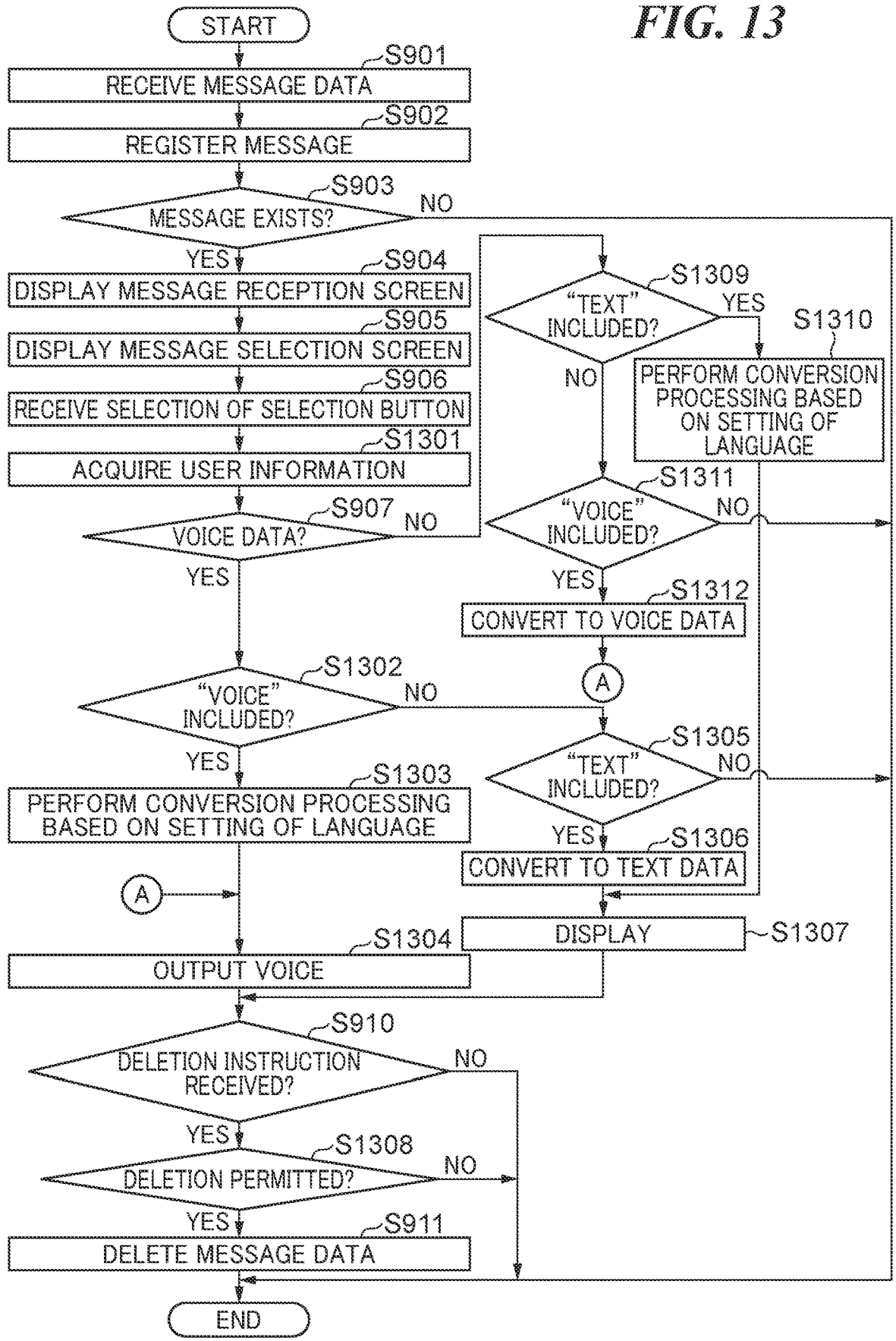
FIG. 13 is a flowchart of a variation of the message reception control process performed by the reception device appearing in FIG. 1.

FIG. 13 is a flowchart of a variation of the message reception control process performed by the reception device 102 in FIG. 1. Note that the variation of the message reception control process, shown in FIG. 13, is similar to the message reception control process in FIG. 9, and in the following, different points of the variation in FIG. 13 from the message reception control process in FIG. 9 will be described. Similar to the message reception control process in FIG. 9, the variation in FIG. 13 is also realized by the CPU of the controller 210 of the reception device 102, which executes a control program stored in the ROM of the controller 210 and loaded into the RAM of the same.

Referring to FIG. 13, the controller 210 executes the steps S901 to S903. If it is determined in the step S903 that the message does not exist, the present process is terminated. If it is determined in the step S903 that the message exists, the process proceeds to the step S904, and then to the steps S905 and S906. Then the controller 210 acquires user information of a user selected as an addressee from the message application server 103 (step S1301). Specifically, the controller 210 controls the communication section 211 to transmit a notification of a request for the user information of the user selected as the addressee, to the message application server 103. The message application server 103 identifies the user information indicated by the received notification of the request from the user information database 1200, and transmits the identified user information to the reception device 102. Then, the process proceeds to the step S907.

If it is determined in the step S907 that the message data of the selected message is voice data, the controller 210 determines whether or not the setting of the output method 1202 of the acquired user information includes "voice" (step S1302).

If it is determined in the step S1302 that the setting of the output method 1202 of the acquired user information includes "voice", it is possible to output the message as voice. In this case, the controller 210 controls the language conversion section 216 to convert the message data based on a setting of the language 1205 of the acquired user information (step S1303) This generates message data for causing the message to be output as voice in a language indicated by the setting of the language 1205. Then, the controller 210 causes the message to be output as voice based on the converted message data (step S1304). Thus, in the present variation, the control is performed to cause the message to be output as voice in a language set in the user information. With this, for a user who is supposed to confirm the message in voice, it is possible to cause the message to be output as voice in a language suited to the user, without forcing the user to make a setting of the language. Then, the process proceeds to the step S910.

If it is determined in the step S1302 that the setting of the output method 1202 of the acquired user information does not include "voice", it is impossible to output the message as voice. In this case, the controller 210 determines whether or not the setting of the output method 1202 of the acquired user information includes "text" (step S1305).

If it is determined in the step S1305 that the setting of the output method 1202 of the acquired user information does not include "text", it is impossible either to output the message as voice or to display the same. In this case, the present process is terminated.

If it is determined in the step S1305 that the setting of the output method 1202 of the acquired user information includes "text", it is possible to display the message. In this case, the controller 210 controls the text conversion section 217 to convert the message data as the voice data to text data (step S1306). Then, the controller 210 causes the user interface display section 212 to display the message based on the message data converted to text data (step S1307). Specifically, the controller 210 causes the user interface display section 212 to display the message display screen 1010 including the message corresponding to the converted message data. The character size of the message displayed on the message display screen 1010 is a character size corresponding to the setting of the character size 1203 of the acquired user information. Thus, in the present variation, the control is performed to cause the message to be displayed in the character size set in the acquired user information. With this, for a user who is supposed to confirm the message by text, it is possible to cause the message to be displayed in the character size suited to the user, without forcing the user to make a setting of the character size. Then, the process proceeds to the step S910.

If it is determined in the step S910 that the instruction for deleting the selected message is not received from the user, the present process is terminated. If it is determined in the step S910 that the instruction for deleting the selected message is received from the user, the controller 210 determines whether or not the deletion of message data of the selected message is permitted (step S1308). In the step S1308, in a case where the setting of the message deletion 1204 of the acquired user information is "inhibited", the controller 210 determines that the deletion of the message data of the selected message is not permitted. On the other hand, in a case where the setting of the message deletion 1204 of the acquired user information is "permitted", the controller 210 determines that the deletion of the message data of the selected message is permitted.

If it is determined in the step S1308 that the deletion of the message data of the selected message is permitted, the process proceeds to the step S911, wherein the processing for deleting the selected message is performed, followed by terminating the present process. If t is determined in the step S1308 that the deletion of the message data of the selected message is not permitted, the controller 210 terminates the present process without deleting the selected message. This makes it possible to prevent other users than the user designated as the addressee from deleting the message by mistake.

If it is determined in the step S907 that the message data of the selected message is not voice data, the message data of the selected message is text data. In this case, the controller 210 determines whether or not the setting of the output method 1202 of the acquired user information includes "text" (step S1309).

If it is determined in the step S1309 that the setting of the output method 1202 of the acquired user information includes "text", it is possible to display the message. In this case, the controller 210 converts the message data based on the setting of the language 1205 of the acquired user information (step S1310). This generate message data for causing the message to be displayed in the language indicated by the setting of the language 1205. Then, the process proceeds to the step S1307. Thus, in the present variation, the control is performed to cause the message to be displayed in the language set in the user information. With this, for a user who is supposed to confirm the displayed message by text, it is possible to cause the message to be displayed in a language suited to the user, without forcing the user to make a setting of the language.

If it is determined in the step S1309 that the setting of the output method 1202 of the acquired user information does not include "text", it is impossible to display the message. In this case, the controller 210 determines whether or not the setting of the output method 1202 of the acquired user information t includes "voice" (step S1311).

If it is determined in the step S1311 that the setting of the output method 1202 of the acquired user information does not include "voice", it is impossible either to display the message or to output the message as voice. In this case, the present process is terminated.

If it is determined in the step S1311 that the setting of the output method 1202 of the acquired user information includes "voice", it is possible to output the message as voice. In this case, the controller 210 controls the voice conversion section 215 to convert the message data as text data to voice data (step S1312). Then, the process proceeds to the step S1304.

Figure 14:
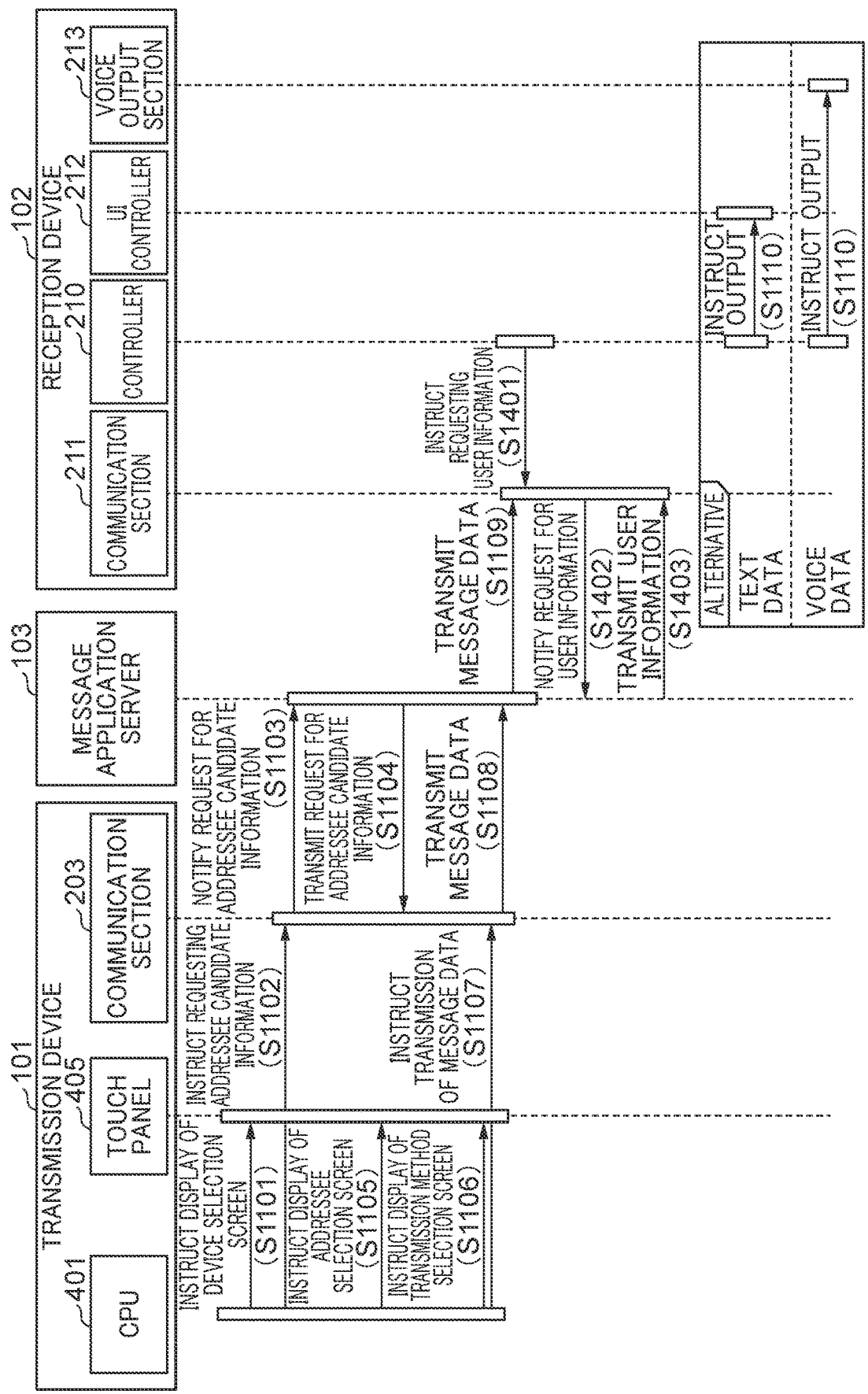
FIG. 14 is a sequence diagram showing a variation of the message communication control process performed by the communication system shown in FIG. 1.

FIG. 14 is a sequence diagram showing a variation of the message communication control process performed by the communication system 100 shown in FIG. 1. The variation of the message communication control process, shown in FIG. 14, is similar to the message communication control process in FIG. 11 and is different from the same in that the transmission device 102 performs the variation of the message reception control process described above with reference to FIG. 13. In the following, different points of the variation from the message communication control process in FIG. 11 will be described. Similar to FIG. 11, FIG. 14 shows a flow of the process from setting of a destination of a message in the transmission device 101 to outputting of the message by the reception device 102. Similar to the message communication control process in FIG. 11, the variation is started when the user inputs an instruction for setting a destination of a message to the touch panel 405 of the transmission device 101.

In the variation shown in FIG. 14, the steps S1101 to S1109 are executed. Then, the controller of the reception device 102 gives a request instruction for requesting user information of the user selected as an addressee to the communication section 211 (step S1401). The communication section 211 having received the request instruction transmits a notification of the request for the user information to the message application server 103 (step S1402). The message application server 103 having received the notification of the request identifies the user information from the user information database 1200. The message application server 103 transmits the identified user information to the transmission device 102 (step S1403).

The controller 210 of the reception device 102 performs, based on the received user information, processing after the step S907 of the message reception control process described with reference to FIG. 13 to thereby output the message.

In the variation described above, based on the user information received from the message application server 103, whether to output the message as voice or to display the same is controlled. This makes it possible to control outputting the message according to a user designated as an addressee.

Note that, in the variation described above, based on the user information received from the message application server 103, which of voice data for outputting the message as voice or text data for displaying the message is to be transmitted may be controlled.

Figure 15:
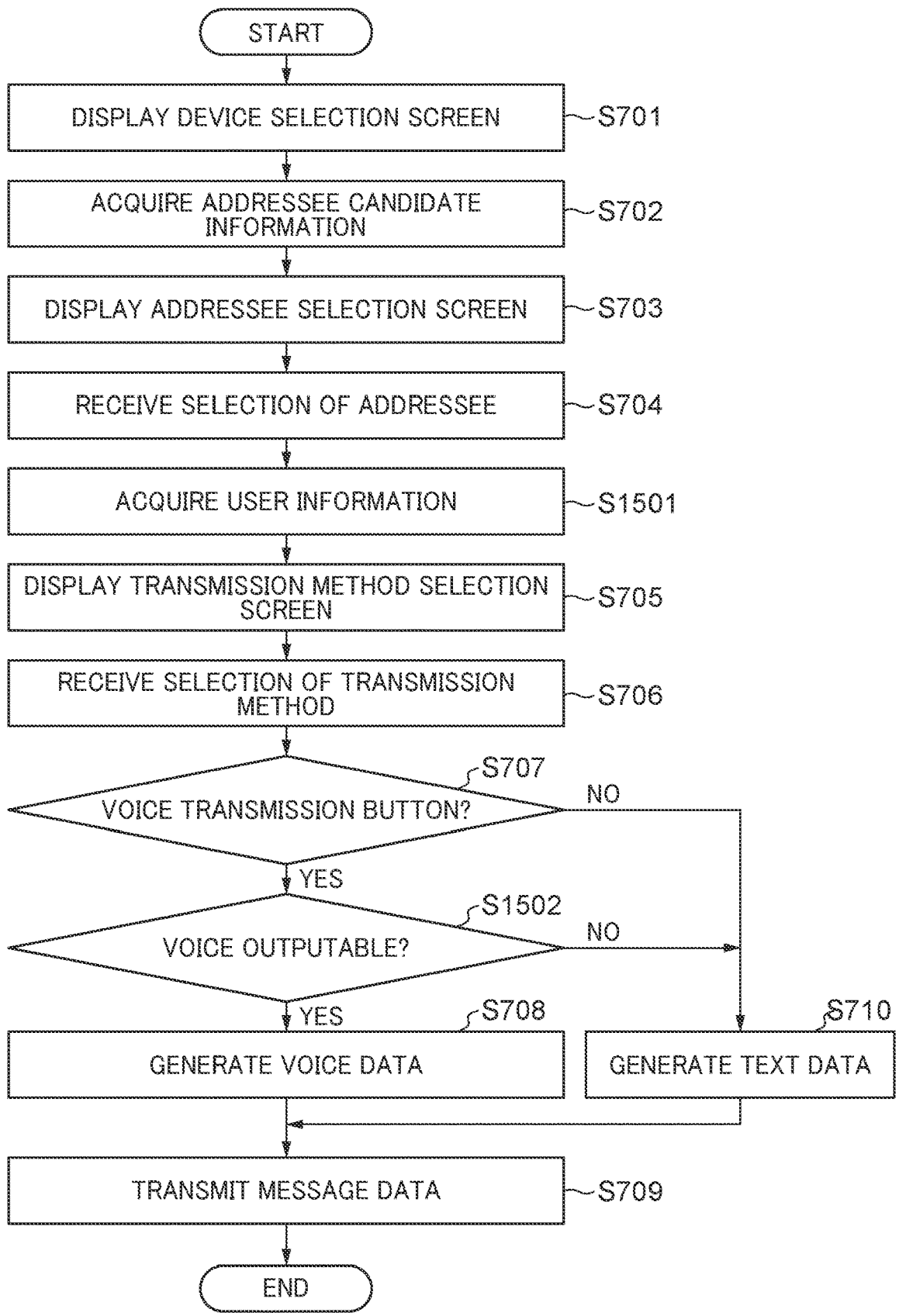
FIG. 15 is a flowchart of a variation of the message transmission control process performed by the transmission device appearing in FIG. 1.

FIG. 15 is a flowchart of a variation of the message transmission control process performed by the transmission device 101 in FIG. 1. The variation of the message transmission control process is similar to the message transmission control process in FIG. 7, and in the following, in particular, different points of the variation from the message transmission control process in FIG. 7 will be described. Similar to the message transmission control process in FIG. 7, the variation in FIG. 15 is realized by the CPU 401 of the transmission device 101, which executes a control program stored in the ROM 402 and loaded into the RAM 403.

In the variation in FIG. 15, the steps S701 to S704 are executed. Then, the CPU 401 acquires the user information of the user selected as an addressee from the message application server 103 (step S1501). Specifically, the CPU 401 controls the communication section 203 to transmit a notification of a request for the user information of a user selected as an addressee on the addressee selection screen 802, to the message application server 103. The message application server 103 identifies the user information indicated by the received notification of the request from the user information database 1200 and transmits the identified user information to the transmission device 101. Then, the process proceeds to the step S705, and to the step S706 and S707.

If it is determined in the step S707 that the selected button is not the voice transmission button 804, the process proceeds to the step S710. The following processing is the same as in the message transmission control process in FIG. 7.

If it is determined in the step S707 that the selected button is the voice transmission button 804, the CPU 401 determines, based on the acquired user information, whether or not the message can be output as voice (step S1502). For example, in a case where the setting of the output method 1202 in the acquired user information includes "voice", it is determined that the message can be output as voice. On the other hand, in a case where the setting of the output method 1202 in the acquired user information does not include "voice", it is determined that the message cannot be output as voice If it is determined in the step S1502 that the message can be output as voice, the process proceeds to the step S708, wherein voice data is generated based on voice which the user inputs to the transmission device 101. The following processing is the same as in the message transmission process in FIG. 7.

If it is determined in the step S1502 that the message cannot be output as voice, the process proceeds to the step S710, wherein text data is generated. The following processing is the same as in the message transmission process in FIG. 7.

In the variation described above, based on the user information received from the message application server 103, which of voice data for outputting a message as voice or text data for displaying the message is to be transmitted is controlled. Thia makes it possible to transmit, out of voice data and text data, message data of a type suited to a user selected as an addressee to the designated destination.

Next, a description will be given of reception of message data by an apparatus having a login function. Here, the following description will be given of reception of message data by the image forming apparatus 105 as an example of the apparatus having a login function.

Figure 16:
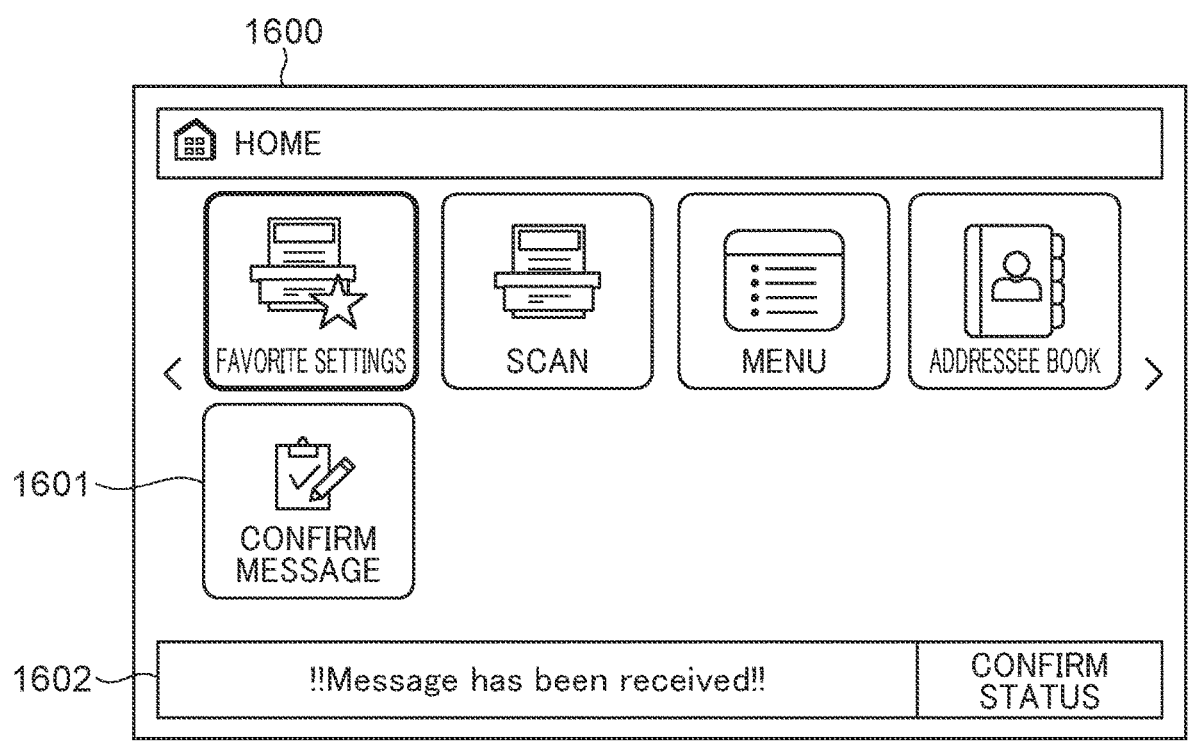
FIG. 16 is a diagram showing an example of a home screen of the image forming apparatus, which is displayed on a console section appearing in FIG. 3.

FIG. 16 is a diagram showing an example of a home screen 1600 of the image forming apparatus 105, displayed on the console section 318 appearing in FIG. 3. The home screen 1600 is for designating execution of each of functions of the image forming apparatus 105, and is displayed on the console section 318 immediately after the image forming apparatus 105 is started up. On the home screen 1600, there are displayed function buttons associated with respective functions of the image forming apparatus 105, such as a favorite settings button, a scan button, a menu button, and an addressee book button. Further, on the home screen 1600, there is also displayed a message confirmation button 1601. The message confirmation button 1601 is a button for a user to confirm a message corresponding to message data received by the image forming apparatus 105. When the user presses the message confirmation button 1601, for example, a screen corresponding to the message reception screen 1001 shown in FIG. 10A is displayed on the console section 318. In the present variation, in a case where a message is registered in the image forming apparatus 105, as shown in FIG. 16, a notification (hereinafter referred to as "message reception notification") notifying to the effect that the message is registered is displayed in a display area 1602 of the home screen 1600.

Figure 17:
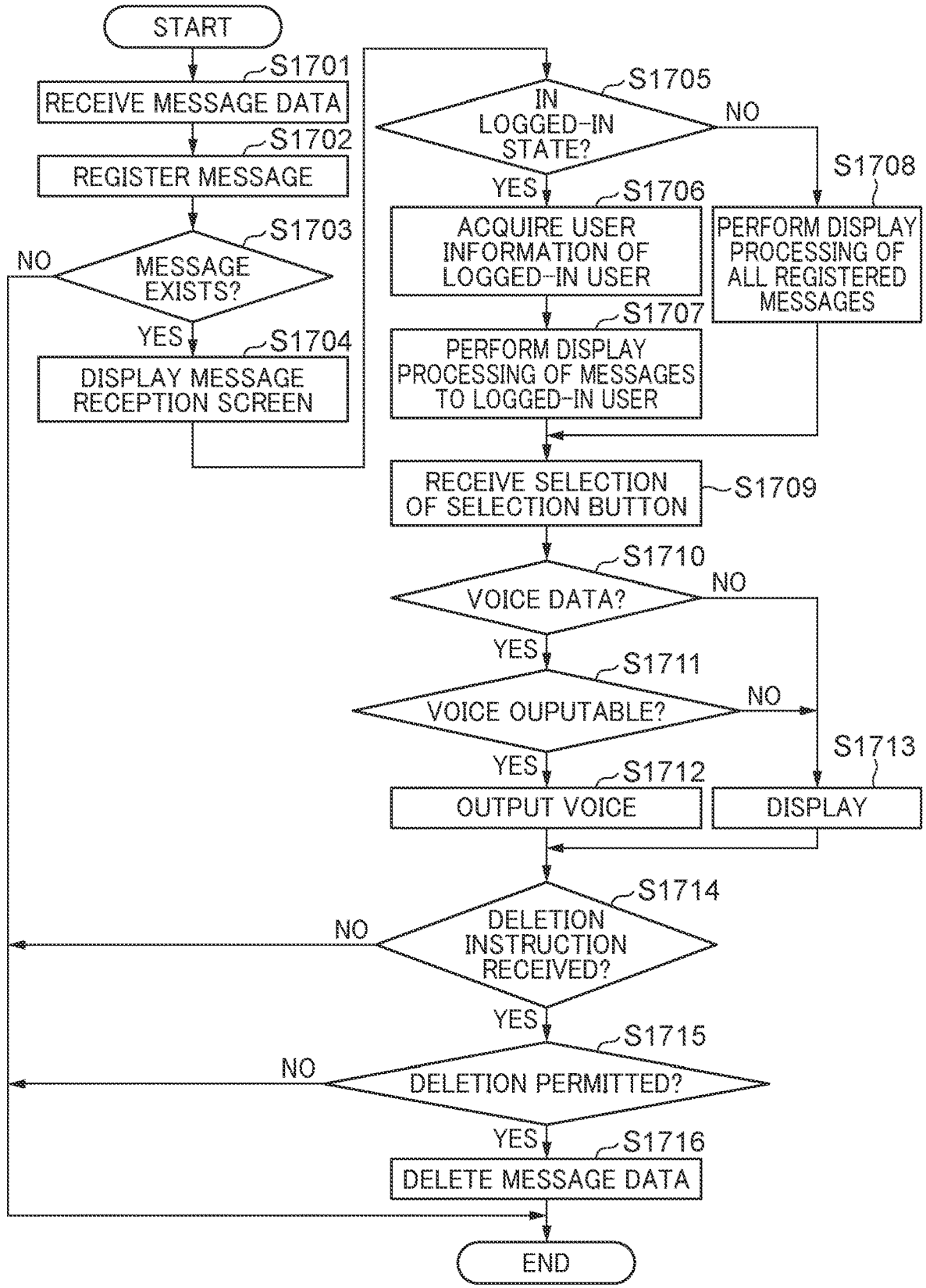
FIG. 17 is a flowchart of another variation of the message reception control process performed by the image forming apparatus appearing in FIG. 1.

FIG. 17 is a flowchart of another variation of the message reception control process, which is performed by the image forming apparatus 105 appearing in FIG. 1. The variation of the message reception control process in FIG. 17 is realized by the CPU 311 of the image forming apparatus 105, which executes a control program stored e.g. in the ROM 312 and loaded into the RAM 313. Note that when the message reception control process in FIG. 17 is started, the home screen 1600 has already been displayed on the console section 318, but the message reception notification is not displayed on the display area 1602.

Referring to FIG. 17, the CPU 311 controls the communication section interface 323 to receive message data from the message application server 103 (step S1701). Next, the CPU 311 registers a message corresponding to the received message data (step S1702). Then, the CPU 311 determines whether or not the message exists (step S1703). In the step S1703, for example, in a case where the registered message remains stored without being deleted, the CPU 311 determines that the message exists. On the other hand, in a case where the registered message has been deleted, the CPU 311 determines that the message does not exist.

If it is determined in the step S1703 that the message does not exist, the present process is terminated. If it is determined in the step S1703 that the message exists, the CPU 311 causes the message reception notification to be displayed on the display area 1602 of the home screen 1600 displayed on the console section 318 (S1704). Next, the CPU 311 determines whether or not the user is in a state logged into the image forming apparatus 105 (hereinafter simply referred to as "the logged-in state") (step S1705).

If it is determined in the step S1705 that the user is in the logged-in state, the CPU 311 acquires user information of the logged-in user from the message application server 103 (step S1706). Note that the logged-in user is a user who has logged into the image forming apparatus 105. In the step S1706, specifically, the CPU 311 controls the communication section interface 323 to transmit a notification of a request for user information of the logged-in user to the message application server 103. The message application server 103 identifies the user information indicated by the received notification of the request from the user information database 1200, and transmits the identified user information to the image forming apparatus 105.

Next, the CPU 311 performs processing for displaying the message addressed to the logged-in user (step S1707). For example, in a case where a plurality of messages addressed to the logged-in user are registered, in the step S1707, as in the message selection screen 1004 described hereinabove with reference to FIG. 10B, a plurality of selection buttons corresponding to the respective messages are displayed on the console section 318. Then, the process proceeds to a step S1709, described hereinafter.

If it is determined in the step S1705 that the user is not in the logged-in state, the CPU 311 causes all the messages registered in the image forming apparatus 105 to be displayed (step S1708). For example, in a case where a plurality of messages are registered in the image forming apparatus 105, in the step S1708, as in the message selection screen 1004 described hereinabove with reference to FIG. 10A, a plurality of selection buttons corresponding to the respective messages are displayed on the console section 318. Then, upon detection of selection of one of the selection buttons on the console section 318 by the user (step S1709), the CPU 311 determines whether or not the message data of the selected message is voice data (step S1710). Note that, in the present variation, for example, if it is determined in the step S1705 that the user is not in the logged-in state, the CPU 311 acquires, prior to execution of the step S1710, user information of the addressee of the selected message from the message application server 103.

If it is determined in the step S1710 that the message data of the selected message is voice data, the CPU 311 determines whether or not the image forming apparatus 105 is capable of outputting the message as voice (step S1711). In the step S1711, for example, in a case where the image forming apparatus 105 is equipped with a voice output section that realizes a voice output function, the CPU 311 determines that the image forming apparatus 105 is capable of outputting the message as voice. On the other hand, in a case where the image forming apparatus 105 is not equipped with the voice output section, the CPU 311 determines that the image forming apparatus 105 is not capable of outputting the message as voice.

If it is determined in the step S1711 that the image forming apparatus 105 is capable of outputting the message as voice, the CPU 311 outputs the selected message as voice (step S1712). In this case, on the console section 318, a screen corresponding to the message display screen 1009 described hereinabove with reference to FIG. 10C, i.e. a screen notifying that voice is being output is displayed. Note that, in the step S1712, the control may be such that the message is output as voice in a language set in the user information acquired from the message application server 103. Then, the process proceeds to a step S1704, described hereinafter.

If it is determined in the step S1710 that the message data of the selected message is not voice data, or if it is determined in the step S1711 that the image forming apparatus 105 is not capable of outputting the message as voice, the process proceeds to the step S1713. In the step S1713, the CPU 311 causes the selected message to be displayed on the console section 318. Specifically, the CPU 311 causes a screen corresponding to the message display screen 1010 described hereinabove with reference to FIG. 10D, i.e. a screen including the selected message to be displayed on the console section 318. Note that in the step S1713, the control may be such that the message is displayed in a language and a character size set in the user information acquired from the message application server 103.

Next, the CPU 311 determines whether or not an instruction for deleting message data of the selected message has been received from the user (step S1714). If it is determined in the step S1714 that the instruction for deleting the message data of the selected message has not been received from the user, the present process is terminated. If it is determined in the step S1714 that the instruction for deleting the message data of the selected message has been received from the user, the CPU 311 determines whether or not deletion of the message data of the selected message is permitted (step S1715). In the step S1715, in a case where the setting of the message deletion 1204 set in the acquired user information is "inhibited", the CPU 311 determines that the deletion of the message data of the selected message is not permitted. On the other hand, in a case where the setting of the message deletion 1204 set in the acquired user information is "permitted", the CPU 311 determines that the deletion of the message data of the selected message is permitted.

If it is determined in the step S1715 that the deletion of the message data of the selected message is permitted, the CPU 311 performs processing for deleting the selected message (step S1716). With this, the message data of the selected message is deleted. Then, the present process is terminated. If it is determined in the step S1715 that the deletion of the message data of the selected message is not permitted, the CPU 311 terminates the present process without performing the processing for deleting the selected message.

Thus, the image forming apparatus 105 having the login function can also exhibit the same advantageous effects as the embodiment and variations described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-079059 filed May 12, 2022, which is hereby incorporated by reference herein in its entirety.

What is claimed is:

1. A communication system comprising:
a server connectable to a network and configured to provide:
candidate information of addressees; and
user information;
a household electrical appliance connectable to the network;
a communication apparatus connectable to the network and comprising:
a display interface configured to display at least one screen configured to permit a user to designate:
the household electrical appliance as a destination of a message;
an addressee of the message based on the candidate information of addressees acquired from the server; and
a transmission method type of the message to be transmitted to the destination from among a plurality of transmission method types including a voice transmission method type and a text transmission method type; and
a processor configured to control processing of the message according to the designated transmission method type, wherein the processor is configured to:
generate message data according to the designated transmission method type in a language set in the user information acquired from the server, wherein the generated message data is:
voice data in a case where the voice transmission method type has been designated; and
display data in a case where the text transmission method type has been designed;
cause the generated message data to be transmitted to the server,
wherein server is configured to receive the message data transmitted from the communication apparatus and transmit the message data to the destination, and
wherein the household electrical appliance includes a controller configured to control displaying of the message data that is the text data and voice reproduction of the message data that is the voice data.

2. The communication system according to claim 1, wherein the message data that is the display data sets a character size to be displayed set in the user information.

3. The communication system according to claim 1, wherein the processor is configured to control, based on the user information acquired from the server, whether to permit deletion of the message according to an instruction by the user.

4. The communication system according to claim 1, wherein the at least one screen is configured to permit a user to designate a plurality of addressees of destinations of the message.

5. A method of controlling communication between a communication apparatus including a processor and a display interface configured to display at least one screen, a household electrical, and a server via a network, wherein server is configured to provide candidate information of addressees and user information, the method comprising:
designating, via the at least one screen of the display interface of the communication apparatus:
the household electrical appliance as a destination of a message;
an addressee of the message based on the candidate information of addressees acquired from the server; and
a transmission method type of the message to be transmitted to the destination from among a plurality of transmission method types including a voice transmission method type and a text transmission method type;
controlling, via the processor, processing of the message, the processing including:
generating message data according to the designated transmission method type in a language set in the user information acquired from the server, wherein the generated message data is:
voice data in a case where the voice transmission method type has been designated; and
display data in a case where the text transmission method type has been designed;
causing the generated message data to be transmitted to the server,
via the server, receiving the message data transmitted from the communication apparatus and transmitting the message data to the destination; and
via the household electrical appliance:
receiving the message data transmitted from the server; and
controlling displaying of the message data that is the text data and voice reproduction of the message data that is the voice data.

6. A non-transitory computer-readable storage medium storing a program executable by a computer to execute a method of controlling communication between a communication apparatus, a household electrical appliance, and a server via a network, the communication apparatus including a processor and a display interface configured to display at least one screen, and the server being configured to provide candidate information of addressees and user information, the method comprising:
designating via the at least one screen of the display interface of the communication apparatus:
the household electrical appliance as a destination of a message;
an addressee of the message based on the candidate information of addressees acquired from the server; and
a transmission method type of the message to be transmitted to the destination from among a plurality of transmission method types including a voice transmission method type and a text transmission method type;
controlling, via the processor, processing of the message, the processing including:
generating of message data according to the designated transmission method type in a language set in the user information acquired from the server, wherein the generated message data is:
voice data in a case where the voice transmission method type has been designated; and display data in a case where the text transmission method type has been designed;
causing the generated message data to be transmitted to the server, via the server, receiving the message data transmitted from the communication apparatus and transmitting the message data to the destination; and via the household electrical appliance:
receiving the message data transmitted from the server; and
controlling displaying of the message data that is the text data and voice reproduction of the message data that is the voice data.

\* \* \* \* \*